United States Patent
Prasad

(10) Patent No.: US 12,216,550 B2
(45) Date of Patent: Feb. 4, 2025

(54) AUTOMATIC BACKUP DISTRIBUTION FOR CLUSTERED DATABASES

(71) Applicant: Rubrik, Inc., Palo Alto, CA (US)

(72) Inventor: Udbhav Prasad, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 17/586,586

(22) Filed: Jan. 27, 2022

(65) Prior Publication Data

US 2023/0236936 A1 Jul. 27, 2023

(51) Int. Cl.
*G06F 11/00* (2006.01)
*G06F 9/50* (2006.01)
*G06F 11/14* (2006.01)

(52) U.S. Cl.
CPC ........ *G06F 11/1464* (2013.01); *G06F 9/5038* (2013.01); *G06F 9/5083* (2013.01); *G06F 11/1435* (2013.01); *G06F 11/1469* (2013.01)

(58) Field of Classification Search
CPC .. G06F 11/1464; G06F 9/5038; G06F 9/5083; G06F 11/1435; G06F 11/1469
See application file for complete search history.

(56) References Cited

U.S. PATENT DOCUMENTS

| | | | |
|---|---|---|---|
| 9,639,428 B1 * | 5/2017 | Boda | G06F 11/1484 |
| 10,289,496 B1 * | 5/2019 | Chopra | G06F 11/1461 |
| 10,592,128 B1 * | 3/2020 | Natanzon | G06F 3/065 |
| 10,769,027 B1 * | 9/2020 | Hauer | G06F 11/1461 |
| 11,288,132 B1 * | 3/2022 | Rajimwale | G06F 11/1469 |
| 11,442,793 B1 * | 9/2022 | Kulkarni | G06F 11/07 |
| 11,689,497 B2 * | 6/2023 | Shen | H04L 61/50 709/226 |
| 11,870,840 B2 * | 1/2024 | Howes | H04L 67/10 |
| 2007/0162514 A1 * | 7/2007 | Civetta | G06F 16/22 |
| 2008/0133622 A1 * | 6/2008 | Brown | G06F 11/1458 |
| 2012/0095968 A1 * | 4/2012 | Gold | G06F 11/1464 707/652 |
| 2012/0117028 A1 * | 5/2012 | Gold | G06F 11/1458 707/640 |
| 2014/0196056 A1 * | 7/2014 | Kottomtharayil | G06F 9/505 718/105 |
| 2015/0088982 A1 * | 3/2015 | Johnson | H04L 67/125 709/203 |
| 2020/0218618 A1 * | 7/2020 | Gokhale | G06F 16/25 |

(Continued)

*Primary Examiner* — Loan L. T. Truong
(74) *Attorney, Agent, or Firm* — Holland & Hart LLP

(57) ABSTRACT

A data management platform may receive, from a user of a data management platform, a first job request to perform a backup of data from a data source to a database managed by the user. In some examples, the database may be configured as a set of database instances running on a set of computing nodes of a computing cluster. The data management platform may store a backup load indication that indicates which computing node is assigned to perform the backup of the data based on receiving the first job request. The data management platform may receive one or more second job requests subsequent to receiving the first job request and may determine a backup load for one or more computing nodes of the set of computing nodes. The data management platform may then assign one or more target computing nodes for performing the one or more second job requests.

20 Claims, 13 Drawing Sheets

(56) References Cited

U.S. PATENT DOCUMENTS

| | | | |
|---|---|---|---|
| 2020/0301748 A1* | 9/2020 | Gupta | G06F 16/27 |
| 2020/0341855 A1* | 10/2020 | Tanwer | G06F 11/1464 |
| 2021/0349785 A1* | 11/2021 | Klus | G06F 11/1461 |
| 2022/0050728 A1* | 2/2022 | Foster, II | G06F 9/505 |
| 2022/0107744 A1* | 4/2022 | Capelo | G06F 3/067 |
| 2022/0188199 A1* | 6/2022 | Quesnelle | G06F 16/134 |
| 2022/0197526 A1* | 6/2022 | Murti | G06F 11/1464 |
| 2022/0197756 A1* | 6/2022 | Potnis | G06F 11/3034 |
| 2022/0277219 A1* | 9/2022 | Tora | G06N 20/00 |
| 2023/0185631 A1* | 6/2023 | Subbarao | G06F 9/544 |
| | | | 718/104 |

* cited by examiner

AUTOMATIC BACKUP DISTRIBUTION FOR CLUSTERED DATABASES

FIELD OF TECHNOLOGY

The present disclosure relates generally to database systems and data processing, and more specifically to techniques for automatic backup distribution for clustered databases.

BACKGROUND

A computing system may be employed to manage, process, backup, and restore data using a network of computing devices.

Cloud providers may support multiple types of storage for varying customer needs. Software may be built to store data in a file system format and use disk-based data storage on cloud instances. However, disk-based data storage may suffer from issues of durability, reliability, and scalability. Some cloud providers may support immutable data storage, data storage with versioning, or both. Techniques for backing up data in cloud providers may be improved.

DETAILED DESCRIPTION

Figure 1:
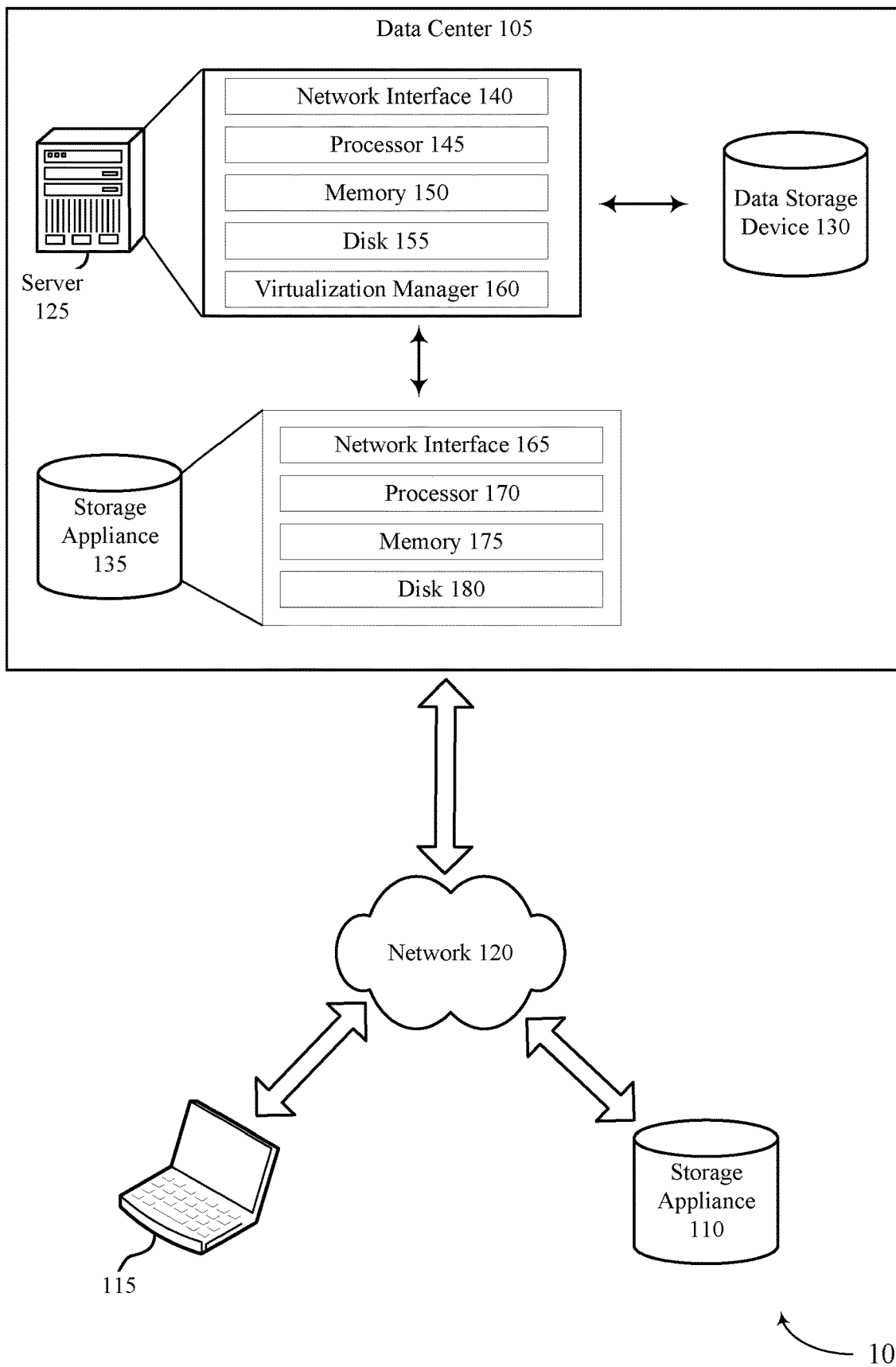
FIG. 1 illustrates an example of a computing environment that supports automatic backup distribution for clustered databases in accordance with aspects of the present disclosure.

Some cloud data storage services may support multi-node clustered storage architecture. In some examples, a large number of production databases may run on multi-node clustered architectures, where the database may have instances running across multiple nodes of a cluster. In particular, clustered databases may allow customers to run a single database across multiple servers (e.g., nodes) in order to maximize availability and enable horizontal scalability, while accessing shared storage. The production databases may also support jobs to backup databases. In some examples, a scheduler may schedule backup jobs on a first available node. Often times, multiple backup jobs are scheduled to run on the same time. If multiple backup jobs run at the same time and on the same node, the simultaneous backup jobs may end up consuming increased memory and processing resources that may be used for other production applications, leading to inefficient usage of resources.

To enhance the efficiency of data backup, the techniques depicted herein provide for distributing backup jobs across multiple nodes in a data storage system. In particular, aspects depicted herein provide for an automatic backup distribution across multiple nodes. In some examples, a backup job scheduler may schedule jobs between nodes based on multiple parameters. A user may submit a request for a backup job to a data management platform. A backup job scheduler at the data management platform may receive a first job request to perform a backup of data from a data source to a database managed by the user of the data management platform. In some examples, the database may be configured as a set of database instances running on a set of computing nodes of a computing cluster. Upon receiving the request, the backup job scheduler may determine a current load on each node and store a backup load indication in a metadata file. The backup load may indicate which computing node is assigned to perform the backup of the data. In some examples, the metadata file is configured to store multiple backup load indications for the database and a set of load balancing metrics for the backup load indications. The backup job scheduler may receive a second job request subsequent to receiving the first job request. The backup job scheduler then determines a backup load for one or more computing nodes and assigns a target computing node to perform the second job request.

In one example, the data management platform may support three nodes: node 1, node 2 and node 3. Node 1 may run a current backup job while nodes 2 and 3 may be available. In such cases, the backup job scheduler may route the incoming backup job to either node 2 or node 3. The backup job scheduler may receive signals of backup load from a node and determines a target node for routing the incoming backup request based on the received signal. In addition, the techniques depicted herein depicts imposing limits on the maximum number of backup jobs that can be run on a node at any given time. The backup job scheduler may also utilize multiple metrics (e.g., a count of the number of backups on a particular node, a size of the database being backed up, amount of data to be ingested, time taken by previous backup jobs, etc.) to determine a target node for performing a backup job.

Aspects of the disclosure are initially described in the context of an environment supporting an on-demand database service. Aspects of the disclosure are further described in the context of computing systems and process flow. Aspects of the disclosure are further illustrated by and described with reference to apparatus diagrams, system diagrams, and flowcharts that relate to automatic backup distribution for clustered databases.

FIG. 1 illustrates an example of a computing environment 100 for cloud computing that supports techniques for data retrieval using cryptographic signatures in accordance with various aspects of the present disclosure. The computing environment 100 may include a data center 105, a storage appliance 110, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 105 may include one or more servers, such as server 125, in communication with one or more storage devices, such as storage device 130. The one or more servers may also be in communication with one or more storage appliances, such as storage appliance 135. The server 125, storage device 130, and storage appliance 135 may be in communication with each other via a networking fabric connecting servers and data storage units within the data center 105 to each other. The storage appliance 135 may include a data management system for backing up virtual machines or files within a virtualized infrastructure. The server 125 may be used to create and manage one or more virtual machines associated with a virtualized infrastructure.

The one or more virtual machines may run various applications, such as a database application or a web server. The storage device 130 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, a data center, such as data center 105, may include multiple servers and/or data storage devices in communication with each other. The one or more data storage devices 130 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients.

One example of server 125 includes a network interface 140, processor 145, memory 150, disk 155, and virtualization manager 160 all in communication with each other. Network interface 140 allows server 125 to connect to one or more networks 120. Network interface 140 may include a wireless network interface and/or a wired network interface. Processor 145 allows server 125 to execute computer-readable instructions stored in memory 150 in order to perform processes described herein. Processor 145 may include one or more processing units, such as one or more CPUs and/or one or more GPUs. Memory 150 may comprise one or more types of memory (e.g., RAM, SRAM, DRAM, ROM, EEPROM, Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as storage appliance 135. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance 135 or storage appliance 110 of FIG. 1, described further below) in response to a request made by the storage appliance. After the data associated with the point in time snapshot of the virtual machine has been transferred to the storage appliance 135, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage appliance 135 or storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 115. The storage appliance 110 may comprise a cloud-based data management system for backing up virtual machines and/or files within a virtualized infrastructure, such as virtual machines running on server 125 or files stored on server 125.

In some examples, networked computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

In some examples, the storage appliance 135 or storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 135 may restore a point-in-time version of a virtual machine or restore point-in-time versions of one or more files located on the virtual machine and transmit the restored data to the server 125. In response to a mount command from the server 125, the storage appliance 135 may allow a point-in-time version of a virtual machine to be mounted and allow the server 125 to read and/or modify data associated with the point-in-time version of the virtual machine. To improve storage density, the storage appliance 135 may deduplicate and compress data associated with different versions of a virtual machine and/or deduplicate and compress data associated with different virtual machines. To improve system performance, the storage appliance 135 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

In accordance with aspects of the present disclosure, the computing environment 100 may utilize automatic backup distribution at data center 105. For example, the data center 105 may be an example of a data management platform. In some examples, the storage appliance 110 may be an example of a data source (e.g., a cloud-based data source). In some examples, the data center 105 (or one or more components or aspects of the data center 105) may receive a first job request to perform a backup of data from a data source to a database managed by the user of the data management platform. In some examples, a user may transmit the job request to the data center 105 using user device 115. In some examples, a user may set up a schedule for backup (e.g. one backup per day at noon) and the data management platform may schedule the backups automatically in accordance with the schedule. Upon receiving the first job request, the data center 105 determines a computing node to perform a backup of data as indicated by the first job request. In the example of FIG. 1, the data storage device 130 may include a node performing a backup in accordance with the first job request. The server 125 may run a backup job scheduler scheduling incoming jobs to different computing nodes. The data center 105 may store a backup load indication that indicates which computing node of a plurality of computing nodes is assigned to perform the backup of the data based on assigning a computing node upon receiving the first job request. The data center 105 may maintain a metadata file including a plurality of backup load indications for the database and a set of load balancing metrics for the plurality of backup load indications. The data center 105 then receives a second job request subsequent to receiving the first job request. Upon receiving the second job request, the backup job scheduler at the data center 105 may assign a computing node to perform backup in accordance with the second job request.

It should be appreciated by a person skilled in the art that one or more aspects of the disclosure may be implemented in a computing environment 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
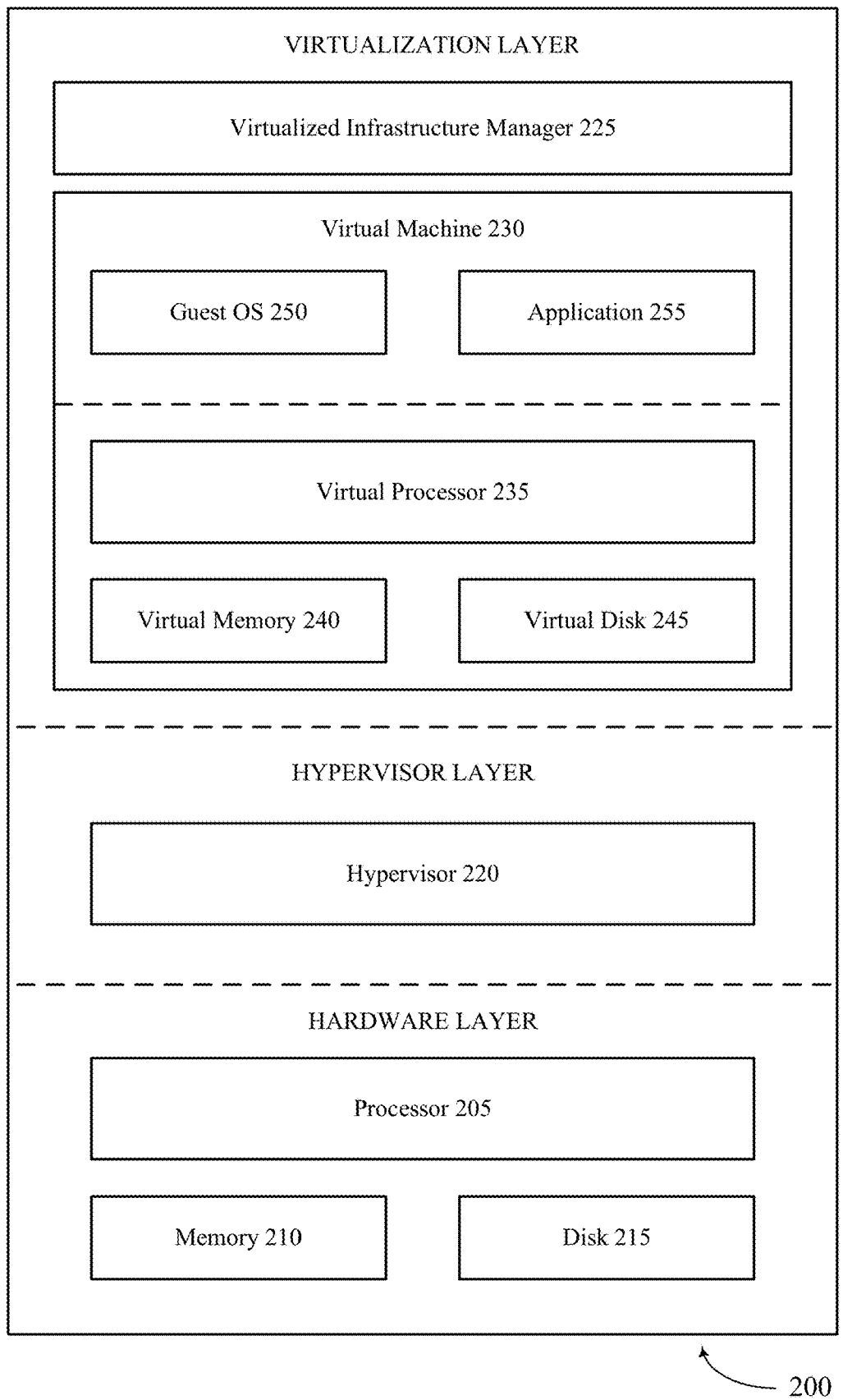
FIG. 2 illustrates an example of a server that supports automatic backup distribution for clustered databases in accordance with aspects of the present disclosure.

FIG. 2 illustrates an example of a server 200 that supports techniques for data retrieval using cryptographic signatures in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more disks 245. In one example, a virtual machine 230 may include a plurality of virtual disks 245, with each virtual disk of the plurality of virtual disks 245 associated with a different file stored on the one or more disks 245. Virtual machine 230 may include a guest operating system 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In an example, a data management application running on a storage appliance, such as storage appliance 110 in FIG. 1 or storage appliance 135 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110 or storage appliance 135. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or storage appliance 135 of FIG. 1 or a plurality of data blocks corresponding with the full image (e.g., to enable a full image-level backup of the virtual machine to be stored on the storage appliance).

In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1 or storage appliance 135 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

In accordance with aspects of the present disclosure, the server 200 in conjunction with a storage device (e.g., a storage appliance 110 as described with reference to FIG. 1) may utilize an automated backup distribution for clustered databases. For example, the server 200 may be an example of a data source. In some examples, the server 200 (or one or more components or aspects of the server 200) may receive, from a user of a data management platform, a first job request to perform a backup of data from a data source to a database managed by the user of the data management platform. In some examples, the database may be configured as a plurality of database instances running on a plurality of computing nodes of a computing cluster. In some examples, a storage device (e.g., storage appliance 110 may include the database) may include the database and the server 200 may include the plurality of computing nodes. The server 200 may store, in a metadata file, a backup load indication that indicates which computing node of the plurality of computing nodes is assigned to perform the backup of the data based on receiving the first job request. In some examples, the metadata file may be configured to store a plurality of backup load indications for the database and a set of load balancing metrics for the plurality of backup load indications. The server 200 may then receive, from the user of the data management platform, one or more second job requests subsequent to receiving the first job request. Upon receiving the one or more second job requests, the server 200 may determine a backup load for one or more computing nodes of the plurality of computing nodes based on the set of load balancing metrics from the metadata file. The server 200 may assign one or more target computing nodes from the plurality of computing nodes for performing the one or more second job requests. In some examples, the server 200 may assign the one or more target computing nodes based on the backup load for the one or more computing nodes and a load balancing configuration associated with the user.

Figure 3:
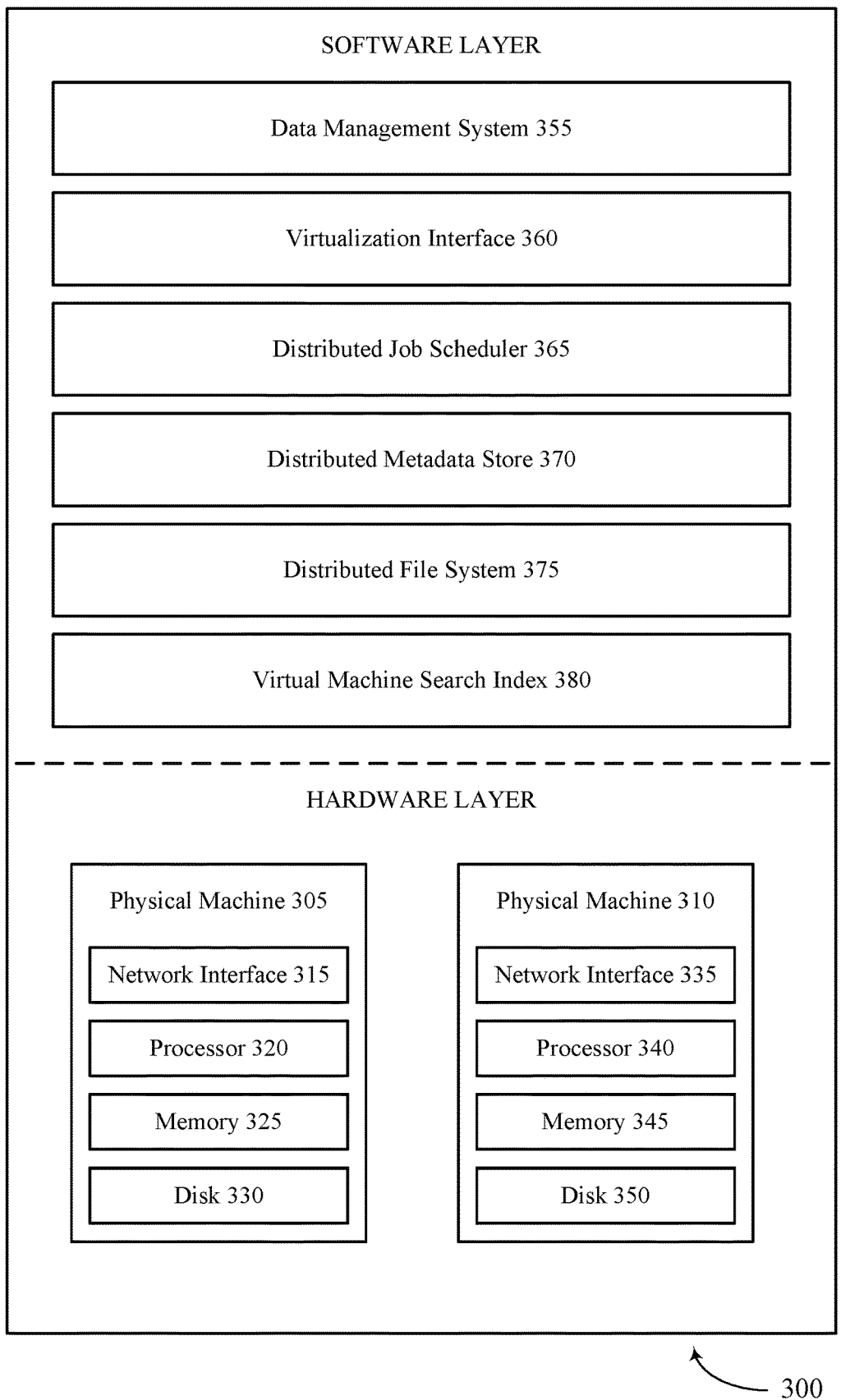
FIG. 3 illustrates an example of a storage appliance that supports automatic backup distribution for clustered databases in accordance with aspects of the present disclosure.

FIG. 3 illustrates an example of a storage appliance 300 that supports techniques for data retrieval using cryptographic signatures in accordance with aspects of the present disclosure. The storage appliance 300 may be an example of a storage appliance 110 or a storage appliance 135 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPUs, RAM (e.g., 108 GB of RAM), SSD space (e.g., a 500 GB SSD), HDD space (e.g., four 4 TB HDDs), and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G−i modulo N. In another example, given a number (N) of nodes in a cluster from node(0) to node(N−1), for a floating IP address (i), the VRRP priority of node G may be (i−j) modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at isnapshotsNM_B/sl/sl.c-hunkl). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

Some data sources (e.g., storage appliance 300) may support automated backup distribution across multiple computing nodes. A storage architecture including the storage appliance 300 may support multi-node clustered architectures, where the database has instances running across multiple nodes of a cluster. A large number of production databases may run on multi-node clustered architectures. Often times, a user may manage databases configured as multiple database instances running on multiple computing nodes of a computing cluster. A user may assign a job request to perform a backup operation to backup of data from a data source to a database managed by the user. The user may also specify a schedule for backup operations. Typically, a backup job scheduler may schedule all backup jobs on a first available node. Because all backup jobs are scheduled to run at the same time and on the same node (e.g., the first node), the simultaneous backup jobs may end up consuming increased memory and processing resources that may be used by other production applications.

Aspects of the present disclosure are described in the context of data being backed up from one or more data sources. For example, data (e.g., files or portions of files of any format) may be backed up from a data source (e.g., data storage appliance, database, server). Although the examples are provided in the context of data sources, it should be understood that these are just illustrative examples, and that the data backup and data transfer and related techniques described herein may occur between data sources of any type. For example, according to one or more aspects of the present disclosure, a backup job scheduler may effectively schedule jobs between nodes based on multiple parameters. A user may submit a request for a backup job and upon receiving the request, the backup job scheduler determines a current backup load on each node. The backup job scheduler may determine a backup load for one or more computing nodes of a set of computing nodes based on a set of load balancing metrics from the metadata file. For example, there may be three nodes: node 1, node 2 and node 3, where node 1 and node 2 are each executing a current backup job and node 3 is available. In such cases, the backup job scheduler may route the incoming backup job to node 3. The backup job scheduler may receive signals of backup load from a node and may determine a target node for routing the incoming backup request. For instance, the backup job may assign one or more target computing nodes for performing a backup based on the backup load for multiple computing nodes and a load balancing configuration associated with a user requesting the backup.

Figure 4:
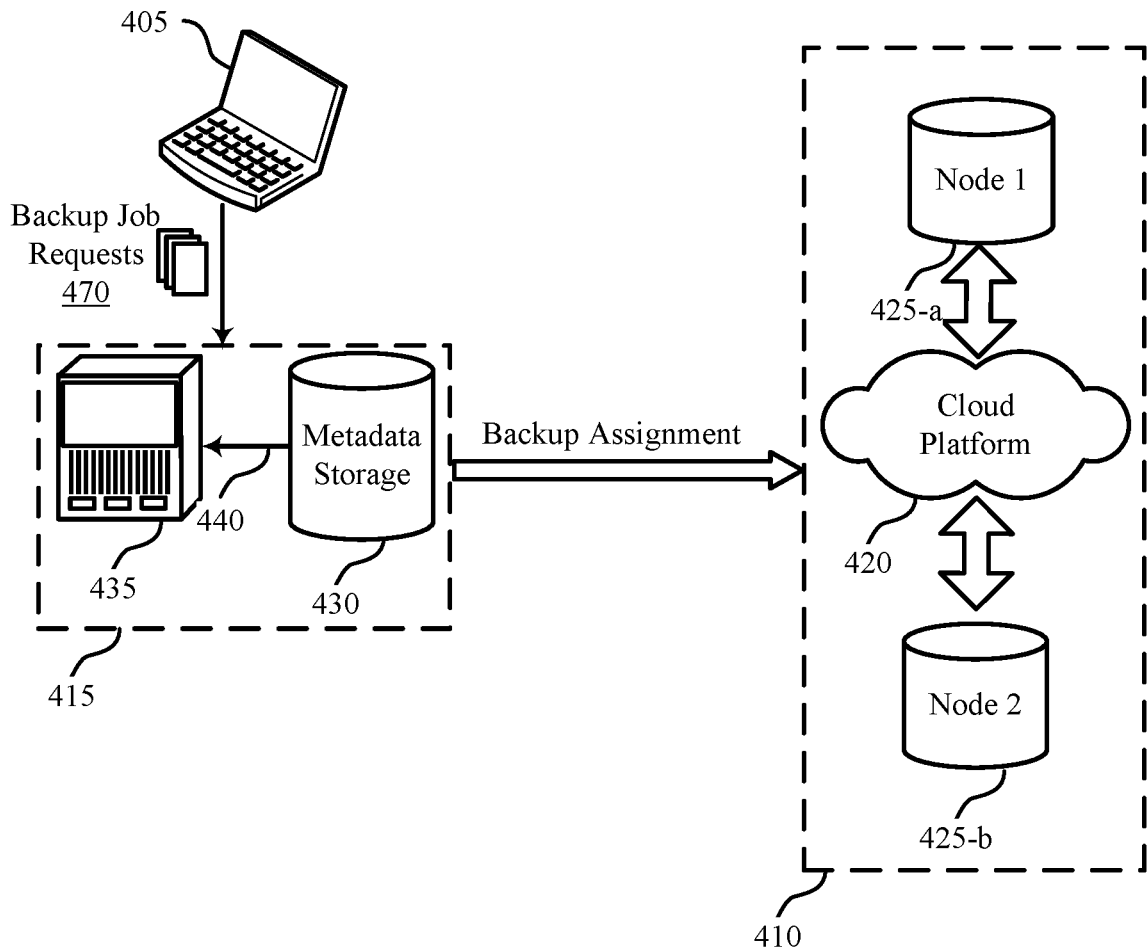
FIG. 4 illustrates an example of a computing system that supports automatic backup distribution for clustered databases in accordance with aspects of the present disclosure.

FIG. 4 illustrates an example of a computing system 400 that supports automatic backup distribution for clustered databases in accordance with aspects of the present disclosure. The computing system 400 includes a user device 405, a computing cluster 410 and a data manager 415. The user device 405 may be an example of a device described with reference to FIG. 1. The user device 405 may also be an example of a cloud client. A cloud client may access data sources using a network connection. The network may implement transfer control protocol and internet protocol (TCP/IP), such as the Internet, or may implement other network protocols. The user device 405 may be an example of a user device, such as a server, a smartphone, or a laptop. In other examples, a user device 405 may be a desktop computer, a tablet, a sensor, or another computing device or system capable of generating, analyzing, transmitting, or receiving communications. In some examples, the user device 405 may be operated by a user that is part of a business, an enterprise, a non-profit, a startup, or any other organization type.

The computing cluster 410 may include a first computing node 425-a and a second computing node 425-b. As depicted in the example of FIG. 4, the computing cluster 410 may include a cloud platform 420. The cloud platform 420 may offer an on-demand storage and computing services to the user device 405. In some cases, the computing cluster 410 may be an example of a storage system with built-in data management. The computing cluster 410 may serve multiple users with a single instance of software. However, other types of systems may be implemented, including—but not limited to—client-server systems, mobile device systems, and mobile network systems. The data manager 415 may be an example of an integrated data management and storage system. The data manager 415 may include a metadata storage 430 and an application server 435. The metadata storage 430 and the application server 435 may collectively represent a unified storage system even though numerous storage nodes may be connected together and the number of connected storage nodes may change over time as storage nodes are added to or removed. The data manager 415 may also be an example of a cloud-based storage and an on-demand computing platform.

As depicted herein, the computing system 400 may support an integrated data management and storage system and may be configured to manage the automated storage, backup, deduplication, replication, recovery, and archival of data within and across physical and virtual computing environments. The computing system 400 including an integrated data management and storage system may provide a unified primary and secondary storage system with built-in data management that may be used as both a backup storage system and a "live" primary storage system for primary workloads. In some cases, the integrated data management and storage system may manage the retrieval of data (e.g., a correct version of a file) using cryptographic signatures. In some examples, the computing system 400 may provide backup of data (e.g., one or more files) residing on virtual machines and/or real machines (e.g., a hardware server, a laptop, a tablet computer, a smartphone, or a mobile computing device).

According to aspects depicted herein, the computing system 400 supports a large number of production databases running on clustered setups. In some examples, such databases may have instances running across multiple nodes of a cluster (e.g., computing cluster 410). The computing system 400 may leverage the high availability and horizontal scalability of cluster configurations to distribute backup load evenly across the nodes in the computing cluster 410. A user using the device 405 may transmit requests to perform backup operations. In some examples, users may delegate backup distribution to the data manager 415 (e.g., by one click). The data manager 415 may leverage cluster availability and scalability to distribute backup load evenly across the computing nodes.

According to aspects depicted herein, a user may transmit a first job request 470 to perform a backup of data from a data source to a database managed by the user. Each backup job may acquire a set of resources (i.e., throttles) needed to run the job successfully. The application server 435 assigns the first job request to a computing node (e.g., computing node 425-a). In this case, the cluster host or node object is a resource that the backup job acquires. The data manager 415 may store, in a metadata storage 430, a backup load indication that indicates which computing node of the set of computing nodes (e.g., first computing node 425-a and computing node 425-b) is assigned to perform the backup of the data indicated in the first job request 470. The metadata storage 430 may be configured to store a set of backup load indications for the database and a set of load balancing metrics 440 for the set of backup load indications. Thus, the data manager 415 may implement software-level throttles for backup and recovery jobs. These throttles may include a signal of a backup load on a particular host. In some examples, assuming equal database sizes, if more backups have acquired throttles on "Host A" compared to "Host B", then the application server 435 may determine that "Host A" has more backup load on it than "Host B". When scheduling a backup, the application server 435 may use these throttles to determine the load on all the hosts (e.g., computing nodes 425) of a cluster (e.g., computing cluster 410) in real time. The application server 435 may then assign the backup to run on the least loaded host.

In some examples, after receiving the first job request, the application server 435 may receive a second job request 470. In some examples, the second job request 470 may include at least one of a job request to back up the database, a job request to backup transactions on the database, a recovery job request, a validation job request, or a combination thereof. The application server 435 determines a backup load for one or more computing nodes 425 based on the set of load balancing metrics 440 from the metadata storage 430. For example, the application server 435 may retrieve the set of load balancing metrics 440 from the metadata storage 430. According to the set of load balancing metrics 440, the application server 435 may use a count of the number of backups of a given type (database or transaction log) on a particular host to determine a backup load. Additionally or alternatively, the application server 435 may assign a weight to each ongoing backup to determine a backup load. The weights may include a size of the database being backed up, an amount of data expected to be ingested in accordance with a job request and time taken by each backup type in the past. In some examples, for a second job request, the application server 435 may consider database and archivelog backups independently of each other. That is, the application server 435 may consider ongoing database backups to include in queued database backups, and may consider ongoing archivelog backups to include in queued archivelog backups. In some examples, the application server 435 may consider database and archivelog backups in conjunction with each other. The application server 435 may consider ongoing backups of all types to include in queued backups of each type. The application server 435 may support ongoing recovery and validation jobs on the computing cluster 410.

Upon determining a backup load for the computing nodes in the computing cluster 410, the application server 435 may assign a target computing node for performing the second job request. The application server 435 may assign the target computing node based on the backup load for one or more computing nodes and a load balancing configuration associated with the user requesting the second job request. As one example, the application server 435 may determine that a first backup job from the first job request is running on the first computing node 425-*a*. Upon receiving the second job request, the application server 435 may assign a second backup job from the second job request to the second computing node 425-*b*. In some examples, the second job request may include at least one of a job request to back up the database, a job request to backup transactions on the database, a recovery job request, a validation job request, or a combination thereof.

In some examples, the application server 435 may determine a change to the computing cluster 410 including the first computing node 425-*a* and the second computing node 425-*b*. The change to the computing cluster may include at least one of a change to a cluster architecture, a change to a quantity of a set of database instances, or a combination thereof. For example, the change to the computing cluster may include new nodes that are added to the computing cluster 410, existing nodes that are removed or disconnected for maintenance or other reasons, new databases that are created, or new instances that are added to existing databases, existing databases that are removed or disconnected, or instances of existing databases that are removed or disconnected.

The application server 435 may impose limits on the maximum number of backup jobs that can be run on a computing node at any given time. For example, if the limit is 3, and 3 backup jobs are already running on a computing node, then a fourth backup job that attempts to acquire a throttle on that host may be unsuccessful. In such cases, the further backup job may wait and try again after a delay period. The application server 435 may use a number, a size of each database, and the distribution of database instances across the computing cluster 410 to make near-real-time decisions on where to schedule backups. The application server 435 may perform backup distribution for on-demand backups, and applies to both database backups and transaction log backups.

Figure 5:
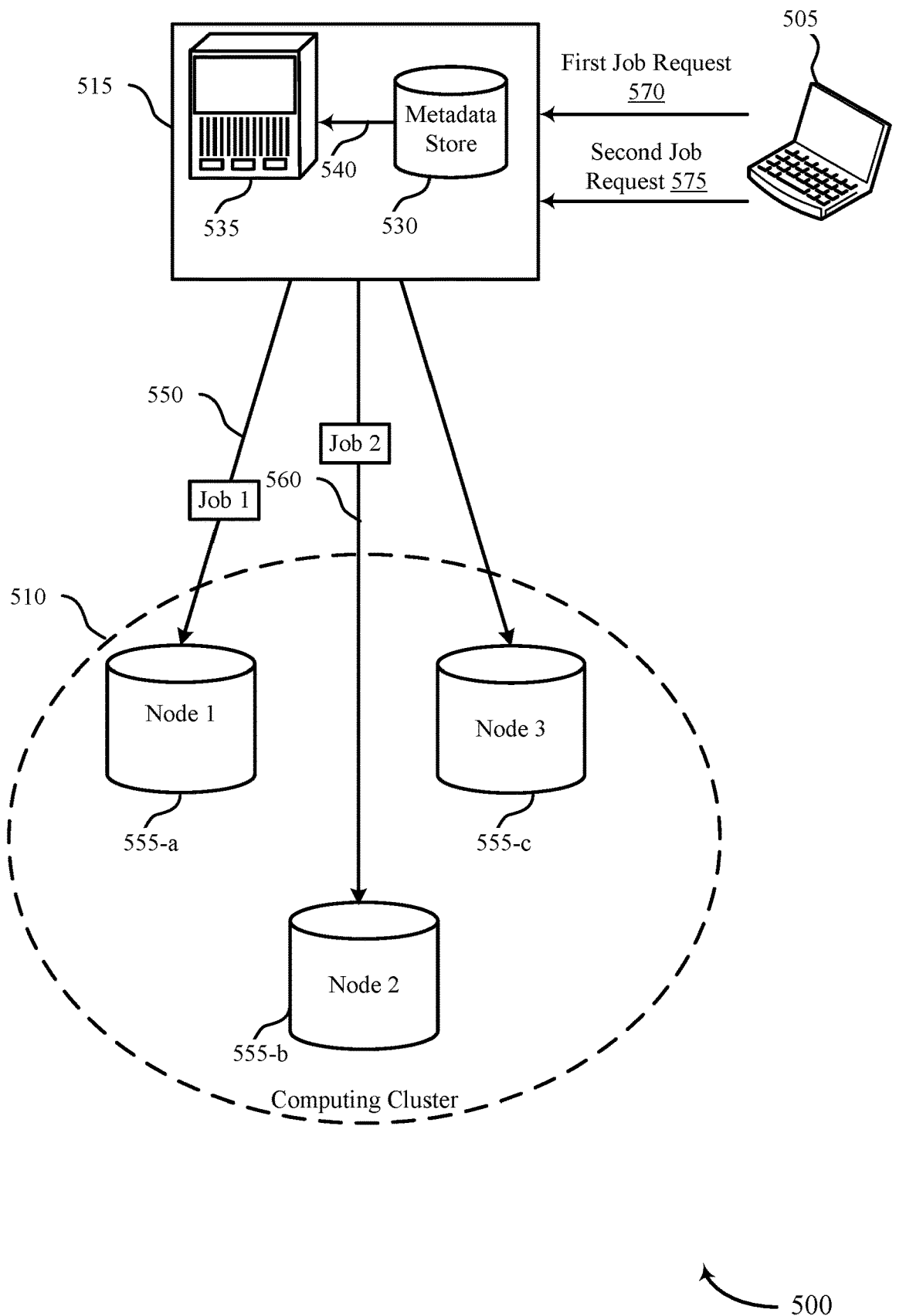
FIG. 5 illustrates an example of a computing system that supports automatic backup distribution for clustered databases in accordance with aspects of the present disclosure.

FIG. 5 illustrates an example of a computing system 500 that supports automatic backup distribution for clustered databases in accordance with aspects of the present disclosure. The computing system 500 includes a user device 505, a data manager 515 and a computing cluster 510. The data manager 515 includes an application server 535 configured to run a backup job scheduler. The data manager 515 further includes a metadata store 530. The computing cluster 510 may include multiple computing nodes 555. In some examples, a database may be configured as a set of database instances running on a plurality of computing nodes 555 of the computing cluster 510. The user device 505 may be an example of a device described with reference to FIGS. 1 and 2. For example, the user device 505 may be an example of a user device, such as a server, a smartphone, a laptop, a desktop computer, a tablet, a sensor, or another computing device or system capable of generating, analyzing, transmitting, or receiving communications.

The data manager 515 may be an example of a cloud-based storage and an on-demand computing platform. As depicted in the example of FIG. 5, the data manager 515 may offer on-demand storage and computing services to the user device 505. The data manager 515 may be an example of an integrated data management and storage system. In some examples, the data manager 515 may manage a distributed cluster of storage nodes. The computing system 500 as depicted with reference to FIG. 5 may represent a unified storage system even though numerous storage nodes may be connected together and the number of connected storage nodes may change over time as storage nodes are added to or removed from the cluster.

As depicted with reference to FIG. 5, the application server 535 may receive a first job request 570 to perform a backup of data from a data source to a database managed by the user. In some examples, the database may be configured as a set of database instances running on a set of computing nodes (e.g., node 1, node 2, and node 3) of a computing cluster 510. The application server may route 550 the backup job request to a first computing node 555-*a* (e.g., node 1). Prior to routing the backup job request, the application server 535 may store a backup load indication in a metadata file included in the metadata store 530. The backup load indication may indicate which computing node of the set of computing nodes (in computing cluster 510) is assigned to perform the backup of the data in accordance with the first job request 570. As depicted with reference to FIG. 5, the metadata store 530 is configured to store multiple backup load indications for the database and a set of load balancing metrics for the set of backup load indications. In some examples, the application server 535 may determine a size of the data for backup in accordance with the first job request 570. The application server 535 may then assign a weight to the backup indicated by the first job request 570 based on the size of the data. The application server 535 may store the assigned weight in the metadata store 530.

In some examples, upon receiving the first job request 570, the application server 535 may receive a second job request 575 subsequent to receiving the first job request 570. Although depicted as being transmitted from the user device 505, it may be understood that the application server 535 may receive the second job request 575 from a different user device. Upon receiving the second job request 575, the application server 535 may determine a backup load for the computing nodes 555 of the computing cluster 510 based on the set of load balancing metrics from the metadata store 530. The application server 535 may determine an amount of data for backup in accordance with the second job request 575. In some examples, the application server 535 may assign the second job request 570 to a second computing node 555-*b* (node 2). The application server 535 may assign the second job request 575 to a target computing node based on determining the amount of data to be backed up.

Upon receiving the second job request 570, the application server 535 may determine that the second job request is associated with backing up a first type of data. Additionally or alternatively, the application server 535 may determine time taken by a particular backup type in the past. The application server 535 may assign the target computing node based on the time taken to back up the particular data type. In some examples, the application server 535 may determine that the second job request includes a request for database backup and archivelog backup (i.e., two types of backup). In such cases, the application server 535 may assign the target computing node for backup considering database backup and archivelog backup in a common job queue. Alternatively, the application server 535 may assign the target computing node for backup considering the database backup and archivelog backup independently of each other (in different job queues). The application server 535 may assign the second job request 575 to the target node. In some examples, the application server 535 may route 560 the second job request 575 to the second computing node 555-b (node 2).

Figure 6:
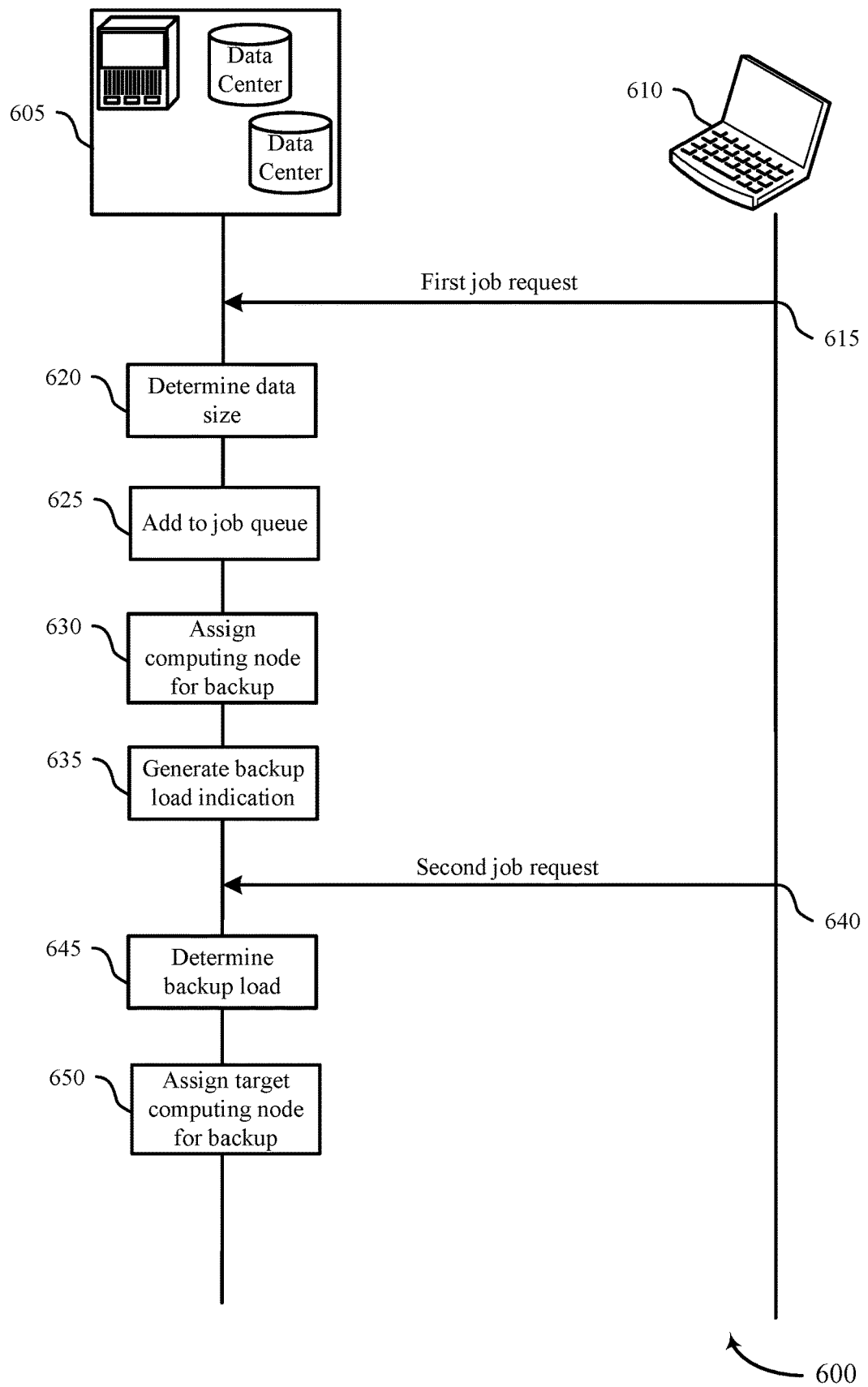
FIG. 6 illustrates an example of a process flow that supports automatic backup distribution for clustered databases in accordance with aspects of the present disclosure.

FIG. 6 illustrates an example of a process flow 600 that supports automatic backup distribution for clustered databases in accordance with aspects of the present disclosure. The process flow 600 includes a data management platform 605 and a user device 610. The data management platform 605 may include an application server, a metadata storage and multiple computing nodes of a computing cluster as described with respect to FIGS. 4 and 5. The user device 610 may be an example of a user device as described with respect to FIGS. 4 and 5. Although a single entity is depicted as data management platform 605, it may be understood that components of the data management platform 605 may be located in different locations.

In some examples, the operations illustrated in the process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 615, the data management platform 605 may receive, from a user of a data management platform, a first job request to perform a backup of data from a data source to a database managed by the user of the data management platform. The data source may represent a set of computing components, data storage components, and the like, as described herein. In some examples, the database may be configured as multiple database instances running on multiple computing nodes of a computing cluster.

At 620, the data management platform 605 may determine a size of the data from the data source for backup in accordance with the first job request. The data management platform 605 may assign a weight to the backup indicated by the first job request based on the size of the data from the data source. In some examples, the data management platform 605 may determine that the first job request is for a first type of data. At 625, the data management platform 605 may add the first job request to a first job queue. At 630, the data management platform 605 may assign the first job request to a first computing node for backup.

At 635, the data management platform 605 may generate a backup load indication that indicates which computing node of the set of computing nodes is assigned to perform the backup of the data based on receiving the first job request. The data management platform 605 may then store the backup load indication in a metadata file.

At 640, the data management platform 605 may receive a second job request subsequent to receiving the first job request. In some examples, the data management platform 605 may determine an amount of data for backup in accordance with the second job request. In some examples, the data management platform 605 may determine that the second job request is associated with backing up a first type of data (e.g., the same type of data as the first job request). Additionally or alternatively, the data management platform 605 may determine that the second job request is associated with backing up a second type of data (e.g., a different type of data from the first job request). The data management platform 605 may determine a time for backing up the first type of data at the one or more computing nodes.

In some examples, the data management platform 605 may determine that the second job request includes job requests for a first type of job and job requests for a second type of job. The data management platform 605 may add the job requests for the first type of job to a first backup job queue and the job requests for the second type of job to a second backup job queue. Alternatively, the data management platform 605 may add the job requests for the first type of job and the job requests for the second type of job to a common backup job queue.

At 645, the data management platform 605 may determine a backup load for one or more computing nodes of the set of computing nodes based on the set of load balancing metrics from the metadata file. In some examples, the data management platform 605 may determine that the first computing node of the plurality of computing nodes is assigned to perform the backup of the data based on the first job request.

Figure 7:
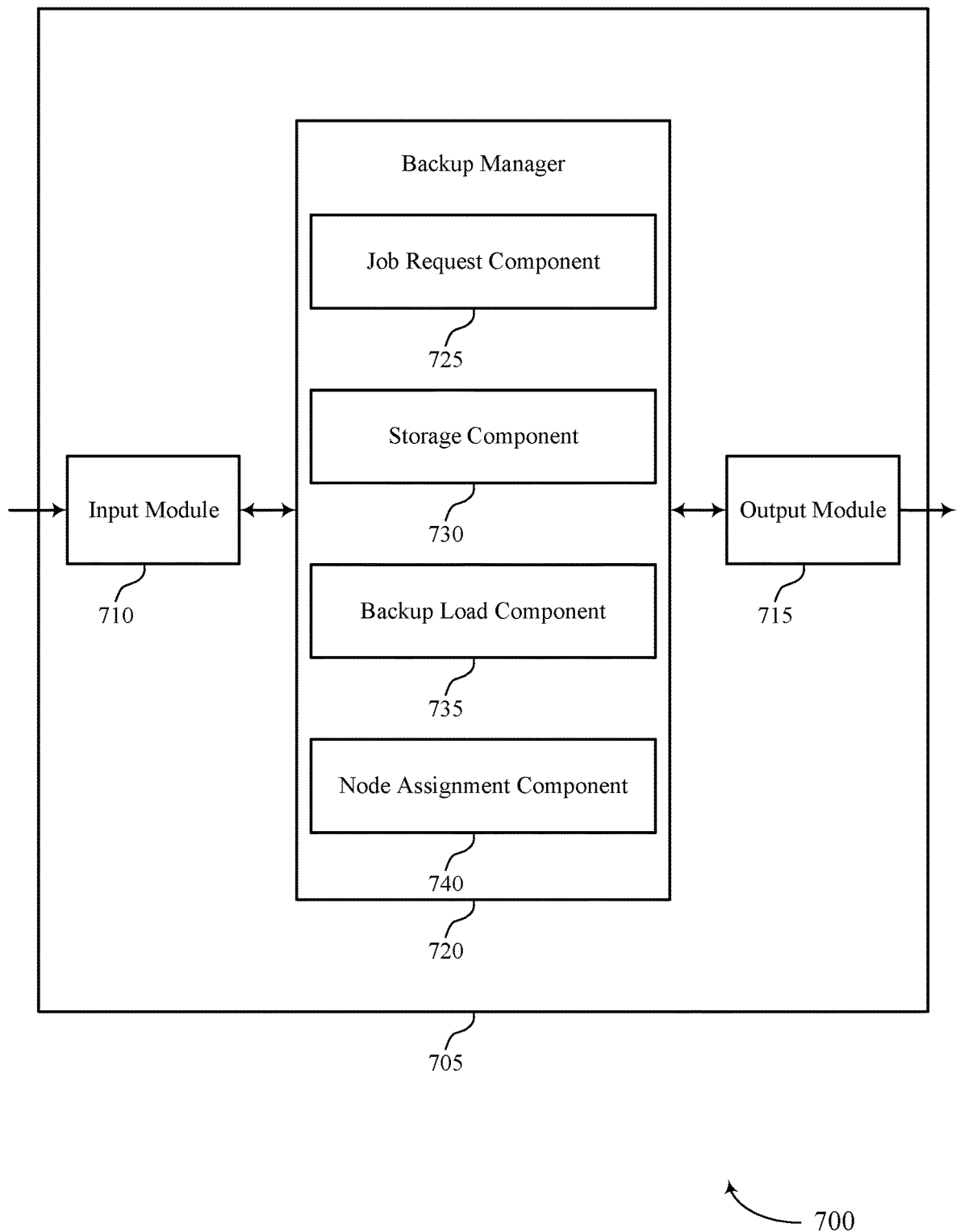
FIG. 7 shows a block diagram of an apparatus that supports automatic backup distribution for clustered databases in accordance with aspects of the present disclosure.

At 650, the data management platform 605 may assign one or more target computing nodes from the set of computing nodes for performing the second job request. The data management platform 605 may assign the one or more target computing nodes based at on the backup load for the one or more computing nodes and a load balancing configuration associated with the user, FIG. 7 shows a block diagram 700 of a device 705 that supports automatic backup distribution for clustered databases in accordance with aspects of the present disclosure. The device 705 may include an input module 710, an output module 715, and a backup manager 720. The device 705 may also include a processor. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the backup manager 720 to support automatic backup distribution for clustered databases. In some cases, the input module 710 may be a component of a network interface 910 as described with reference to FIG. 9.

The output module 715 may manage output signals for the device 705. For example, the output module 715 may receive signals from other components of the device 705, such as the backup manager 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of a network interface 910 as described with reference to FIG. 9.

For example, the backup manager 720 may include a job request component 725, a storage component 730, a backup load component 735, a node assignment component 740, or any combination thereof. In some examples, the backup manager 720, or various components thereof, may be configured to perform various operations (e.g., receiving, monitoring, transmitting) using or otherwise in cooperation with the input module 710, the output module 715, or both. For example, the backup manager 720 may receive information from the input module 710, send information to the output module 715, or be integrated in combination with the input module 710, the output module 715, or both to receive information, transmit information, or perform various other operations as described herein.

The backup manager 720 may support backup job distribution in accordance with examples as disclosed herein. The job request component 725 may be configured as or otherwise support a means for receiving, from a user of a data management platform, a first job request to perform a backup of data from a data source to a database managed by the user of the data management platform, wherein the database is configured as a plurality of database instances running on a plurality of computing nodes of a computing cluster. The storage component 730 may be configured as or otherwise support a means for storing, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications. The job request component 725 may be configured as or otherwise support a means for receiving, from the user of the data management platform, one or more second job requests subsequent to receiving the first job request. The backup load component 735 may be configured as or otherwise support a means for determining a backup load for one or more computing nodes of the plurality of computing nodes based at least in part on the set of load balancing metrics from the metadata file. The node assignment component 740 may be configured as or otherwise support a means for assigning, based at least in part on the backup load for the one or more computing nodes and a load balancing configuration associated with the user, one or more target computing nodes from the plurality of computing nodes for performing the one or more second job requests.

Figure 8:
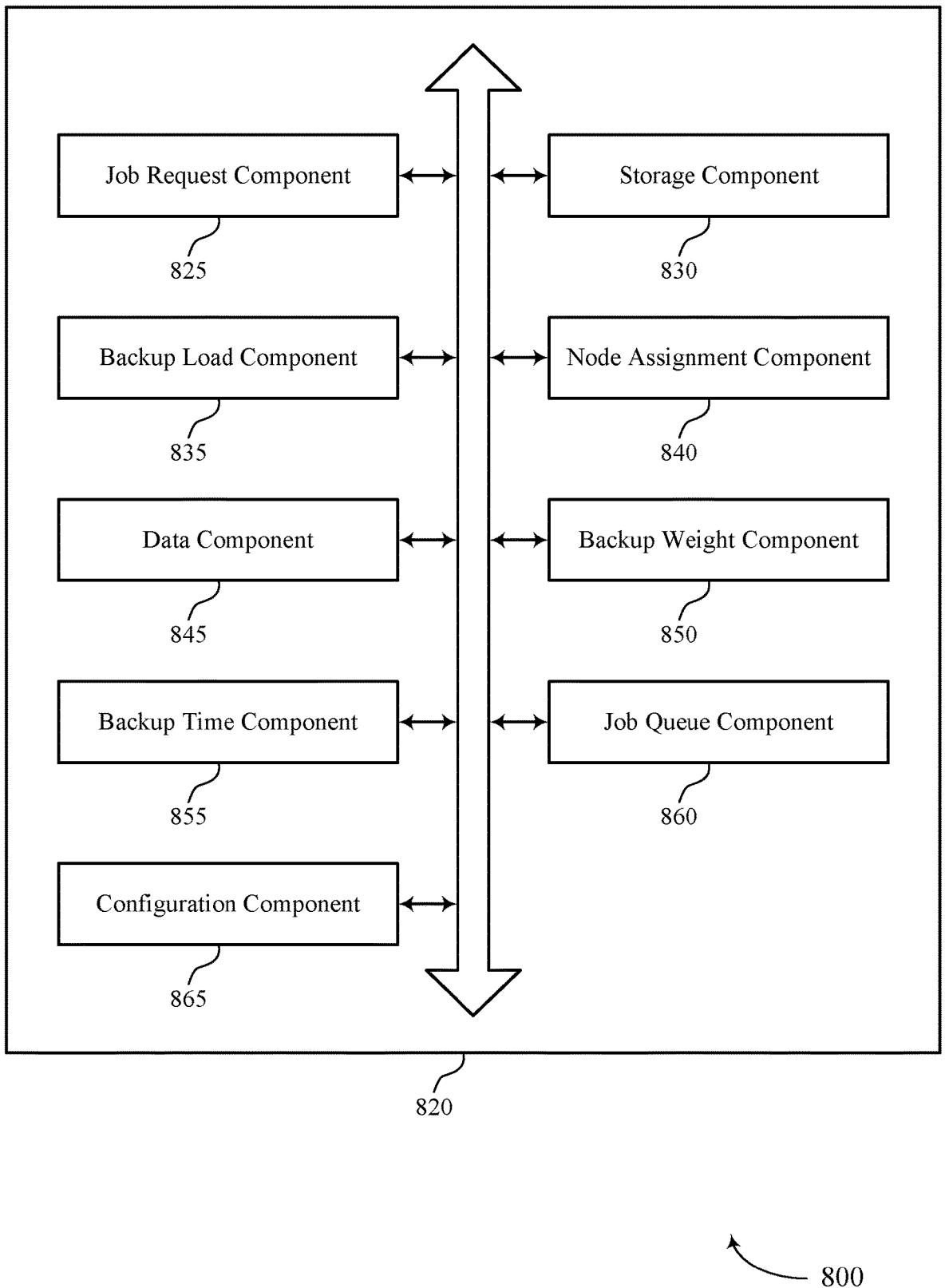
FIG. 8 shows a block diagram of a backup manager that supports automatic backup distribution for clustered databases in accordance with aspects of the present disclosure.

FIG. 8 shows a block diagram 800 of a backup manager 820 that supports automatic backup distribution for clustered databases in accordance with aspects of the present disclosure. The backup manager 820 may be an example of aspects of a data source or a backup manager 720, or both, as described herein. The backup manager 820, or various components thereof, may be an example of means for performing various aspects of automatic backup distribution for clustered databases as described herein. For example, the backup manager 820 may include a job request component 825, a storage component 830, a backup load component 835, a node assignment component 840, a data component 845, a backup weight component 850, a backup time component 855, a job queue component 860, a configuration component 865, or any combination thereof. Each of these components may communicate, directly or indirectly, with one another (e.g., via one or more buses).

The backup manager 820 may support backup job distribution in accordance with examples as disclosed herein. The job request component 825 may be configured as or otherwise support a means for receiving, from a user of a data management platform, a first job request to perform a backup of data from a data source to a database managed by the user of the data management platform, wherein the database is configured as a plurality of database instances running on a plurality of computing nodes of a computing cluster. The storage component 830 may be configured as or otherwise support a means for storing, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications. In some examples, the job request component 825 may be configured as or otherwise support a means for receiving, from the user of the data management platform, one or more second job requests subsequent to receiving the first job request. The backup load component 835 may be configured as or otherwise support a means for determining a backup load for one or more computing nodes of the plurality of computing nodes based at least in part on the set of load balancing metrics from the metadata file. The node assignment component 840 may be configured as or otherwise support a means for assigning, based at least in part on the backup load for the one or more computing nodes and a load balancing configuration associated with the user, one or more target computing nodes from the plurality of computing nodes for performing the one or more second job requests.

In some examples, the data component 845 may be configured as or otherwise support a means for determining a size of the data from the data source for backup in accordance with the first job request. In some examples, the backup weight component 850 may be configured as or otherwise support a means for assigning a weight to the backup indicated by the first job request based at least in part on the size of the data from the data source, wherein assigning the one or more target computing nodes is based at least in part on assigning the weight to the backup indicated by the first job request.

In some examples, the job request component 825 may be configured as or otherwise support a means for determining an amount of data for backup in accordance with the one or more second job requests, wherein assigning the one or more target computing nodes is based at least in part on determining the amount of data.

In some examples, the job request component 825 may be configured as or otherwise support a means for determining that the one or more second job requests are associated with backing up a first type of data. In some examples, the backup time component 855 may be configured as or otherwise support a means for determining a time for backing up the first type of data at the one or more computing nodes, wherein assigning the one or more target computing nodes is based at least in part on determining the time for backing up the first type of data.

In some examples, the job request component 825 may be configured as or otherwise support a means for determining that the one or more second job requests comprises job requests for a first type of job and job requests for a second type of job. In some examples, the job queue component 860 may be configured as or otherwise support a means for adding the job requests for the first type of job and the job requests for the second type of job to a backup job queue, wherein assigning the one or more target computing nodes is based at least in part on the backup job queue.

In some examples, the job request component 825 may be configured as or otherwise support a means for determining that the one or more second job requests comprises job requests for a first type of job and job requests for a second type of job. In some examples, the job queue component 860 may be configured as or otherwise support a means for adding the job requests for the first type of job to a first backup job queue and the job requests for the second type of job to a second backup job queue, wherein assigning the one or more target computing nodes is based at least in part on the first backup job queue and the second backup job queue.

In some examples, the job request component 825 may be configured as or otherwise support a means for determining that a first computing node of the plurality of computing nodes is assigned to perform the backup of the data based at least in part on the first job request, wherein assigning the one or more target computing nodes comprises assigning a second computing node of the plurality of computing nodes for performing the one or more second job requests, the second computing node being different from the first computing node.

In some examples, the configuration component 865 may be configured as or otherwise support a means for receiving, from the user of a data management platform, the load balancing configuration associated with the user. In some examples, the configuration component 865 may be configured as or otherwise support a means for storing the load balancing configuration associated with the user in the metadata file.

In some examples, the one or more second job requests comprise at least one of a job request to backup the database, a job request to backup transactions on the database, a recovery job request, a validation job request, or a combination thereof.

In some examples, the node assignment component 840 may be configured as or otherwise support a means for determining a change to the computing cluster comprising the plurality of computing nodes, wherein assigning the one or more target computing nodes is based at least in part on the change to the computing cluster.

In some examples, the change to the computing cluster comprises at least one of a change to a cluster architecture, a change to a quantity of the plurality of database instances, or a combination thereof. In some examples, the database comprises a clustered database or a stand-alone database.

Figure 9:
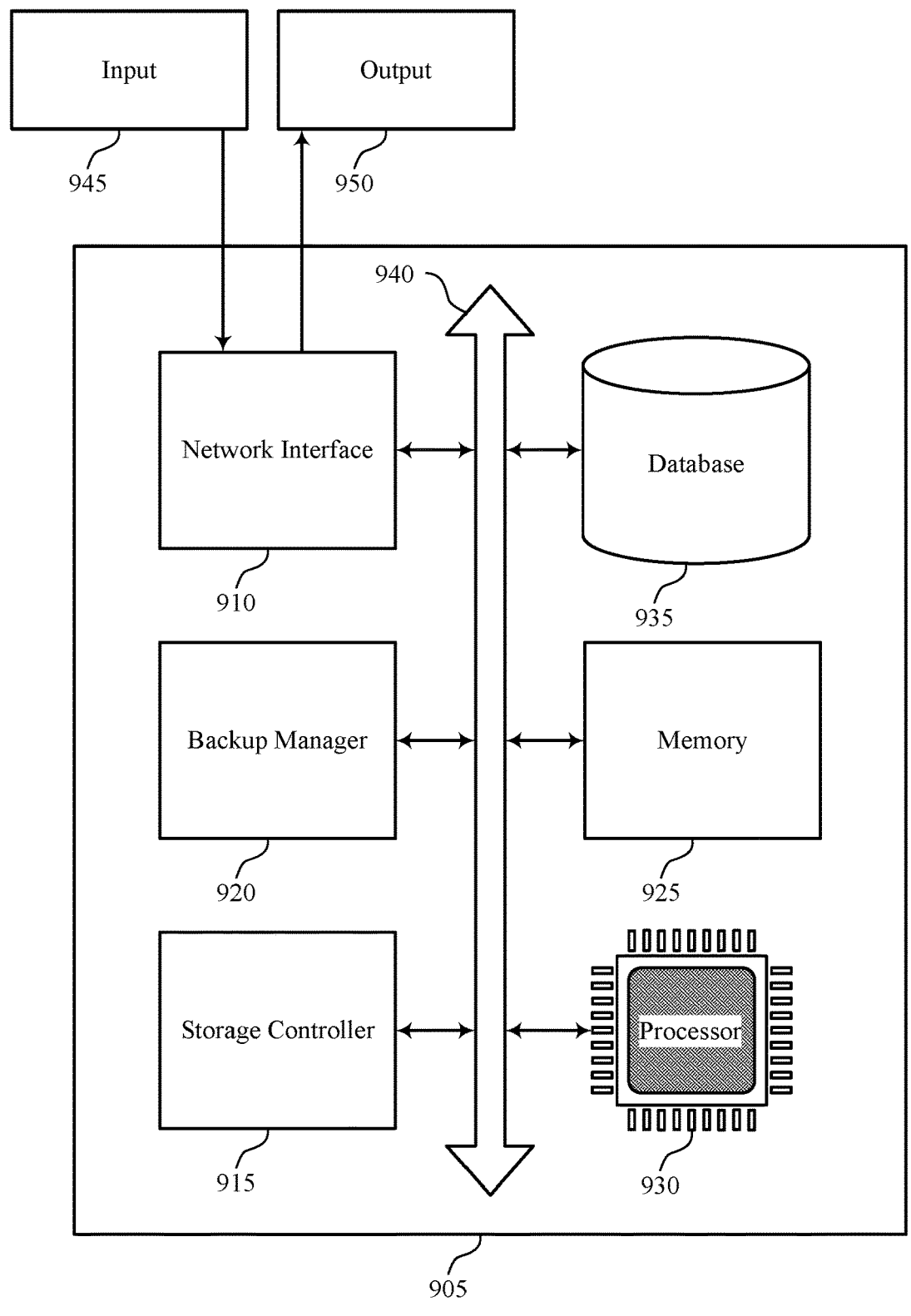
FIG. 9 shows a diagram of a system including a device that supports automatic backup distribution for clustered databases in accordance with aspects of the present disclosure.

FIG. 9 shows a diagram of a system 900 including a device 905 that supports automatic backup distribution for clustered databases in accordance with aspects of the present disclosure. The device 905 may be an example of or include the components of a device 705 as described herein. The device 905 may include components for bi-directional data communications including components for transmitting and receiving communications, such as a backup manager 920, a network interface 910, a storage controller 915, a memory 925, a processor 930, and a database 935. These components may be in electronic communication or otherwise coupled (e.g., operatively, communicatively, functionally, electronically, electrically) via one or more buses (e.g., a bus 940).

The network interface 910 may manage input signals 945 and output signals 950 for the device 905. The network interface 910 may also manage peripherals not integrated into the device 905. In some cases, the network interface 910 may represent a physical connection or port to an external peripheral. In some cases, the network interface 910 may utilize an operating system such as iOS®, ANDROID®, MS-DOS®, MS-WINDOWS®, OS/2®, UNIX®, LINUX®, or another known operating system. In other cases, the network interface 910 may represent or interact with a modem, a keyboard, a mouse, a touchscreen, or a similar device. In some cases, the network interface 910 may be implemented as part of a processor 930. In some examples, a user may interact with the device 905 via the network interface 910 or via hardware components controlled by the network interface 910.

The storage controller 915 may manage data storage and processing in a database 935. In some cases, a user may interact with the storage controller 915. In other cases, the storage controller 915 may operate automatically without user interaction. The database 935 may be an example of a single database, a distributed database, multiple distributed databases, a data store, a data lake, or an emergency backup database.

Memory 925 may include random-access memory (RAM) and ROM or any other memory type as described with reference to FIGS. 1-3. The memory 925 may store computer-readable, computer-executable software including instructions that, when executed, cause the processor 930 to perform various functions described herein. In some cases, the memory 925 may contain, among other things, a BIOS which may control basic hardware or software operation such as the interaction with peripheral components or devices.

The processor 930 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting automatic backup distribution for clustered databases).

The backup manager 920 may support backup job distribution in accordance with examples as disclosed herein. For example, the backup manager 920 may be configured as or otherwise support a means for receiving, from a user of a data management platform, a first job request to perform a backup of data from a data source to a database managed by the user of the data management platform, wherein the database is configured as a plurality of database instances running on a plurality of computing nodes of a computing cluster. The backup manager 920 may be configured as or otherwise support a means for storing, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications. The backup manager 920 may be configured as or otherwise support a means for receiving, from the user of the data management platform, one or more second job requests subsequent to receiving the first job request. The backup manager 920 may be configured as or otherwise support a means for determining a backup load for one or more computing nodes of the plurality of computing nodes based at least in part on the set of load balancing metrics from the metadata file. The backup manager 920 may be configured as or otherwise support a means for assigning, based at least in part on the backup load for the one or more computing nodes and a load balancing configuration associated with the user, one or more target computing nodes from the plurality of computing nodes for performing the one or more second job requests.

By including or configuring the backup manager 920 in accordance with examples as described herein, the device 905 may support techniques for backup load distribution across multiple computing nodes.

Figure 10:
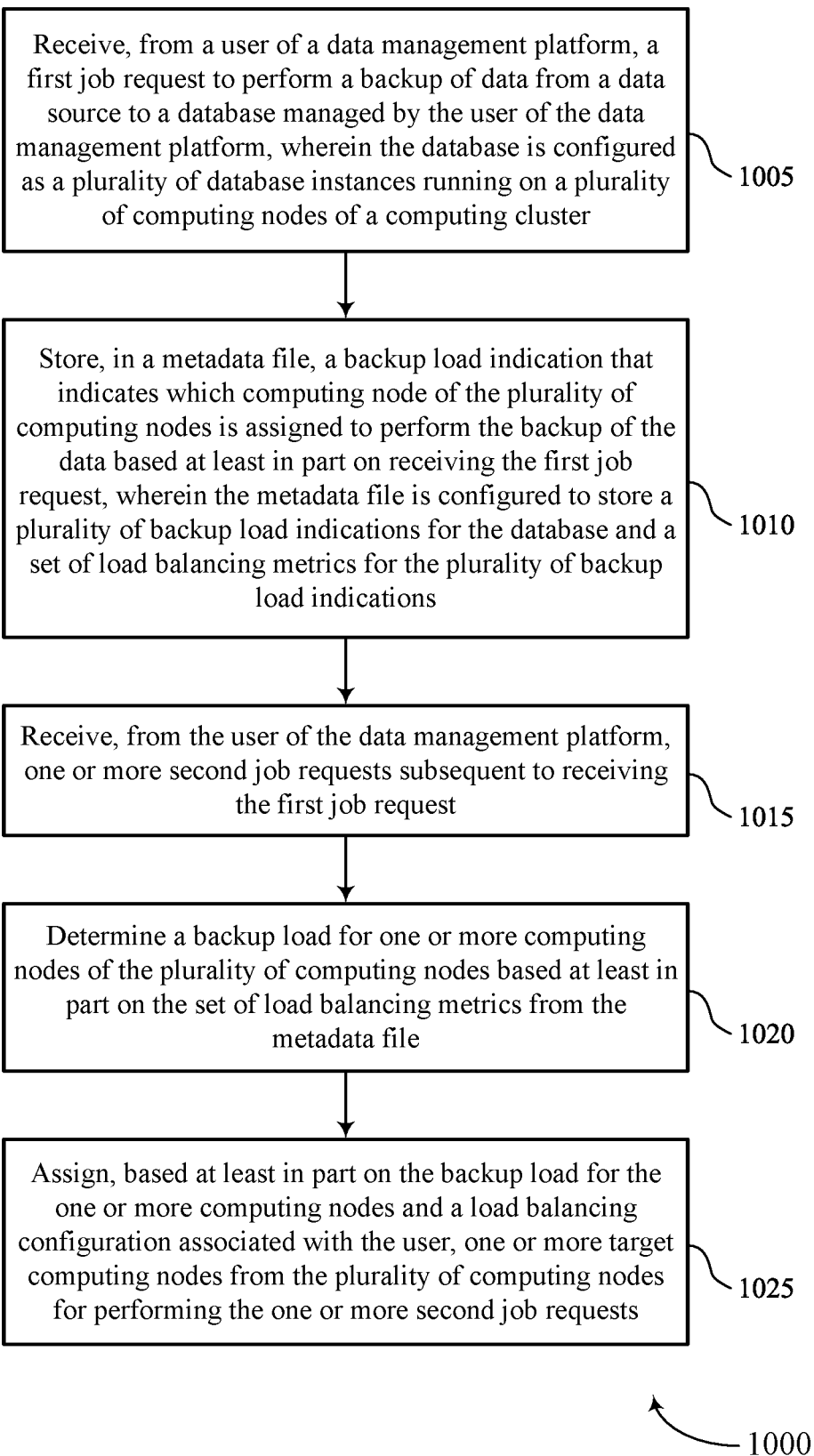
FIGS. 10 through 13 show flowcharts illustrating methods that support automatic backup distribution for clustered databases in accordance with aspects of the present disclosure.

FIG. 10 shows a flowchart illustrating a method 1000 that supports automatic backup distribution for clustered databases in accordance with aspects of the present disclosure. The operations of the method 1000 may be implemented by a data source or its components as described herein. For example, the operations of the method 1000 may be performed by a data source as described with reference to FIGS. 1 through 9. In some examples, a data source may execute a set of instructions to control the functional elements of the data source to perform the described functions. Additionally or alternatively, the data source may perform aspects of the described functions using special-purpose hardware.

At 1005, the method may include receiving, from a user of a data management platform, a first job request to perform a backup of data from a data source to a database managed by the user of the data management platform, wherein the database is configured as a plurality of database instances running on a plurality of computing nodes of a computing cluster. The operations of 1005 may be performed in accordance with examples as disclosed herein. In some examples, aspects of the operations of 1005 may be performed by a job request component 825 as described with reference to FIG. 8.

At 1010, the method may include storing, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications. The operations of 1010 may be performed in accordance with examples as disclosed herein. In some examples, aspects of the operations of 1010 may be performed by a storage component 830 as described with reference to FIG. 8.

At 1015, the method may include receiving, from the user of the data management platform, one or more second job requests subsequent to receiving the first job request. The operations of 1015 may be performed in accordance with examples as disclosed herein. In some examples, aspects of the operations of 1015 may be performed by a job request component 825 as described with reference to FIG. 8.

At 1020, the method may include determining a backup load for one or more computing nodes of the plurality of computing nodes based at least in part on the set of load balancing metrics from the metadata file. The operations of 1020 may be performed in accordance with examples as disclosed herein. In some examples, aspects of the operations of 1020 may be performed by a backup load component 835 as described with reference to FIG. 8.

At 1025, the method may include assigning, based at least in part on the backup load for the one or more computing nodes and a load balancing configuration associated with the user, one or more target computing nodes from the plurality of computing nodes for performing the one or more second job requests. The operations of 1025 may be performed in accordance with examples as disclosed herein. In some examples, aspects of the operations of 1025 may be performed by a node assignment component 840 as described with reference to FIG. 8.

Figure 11:
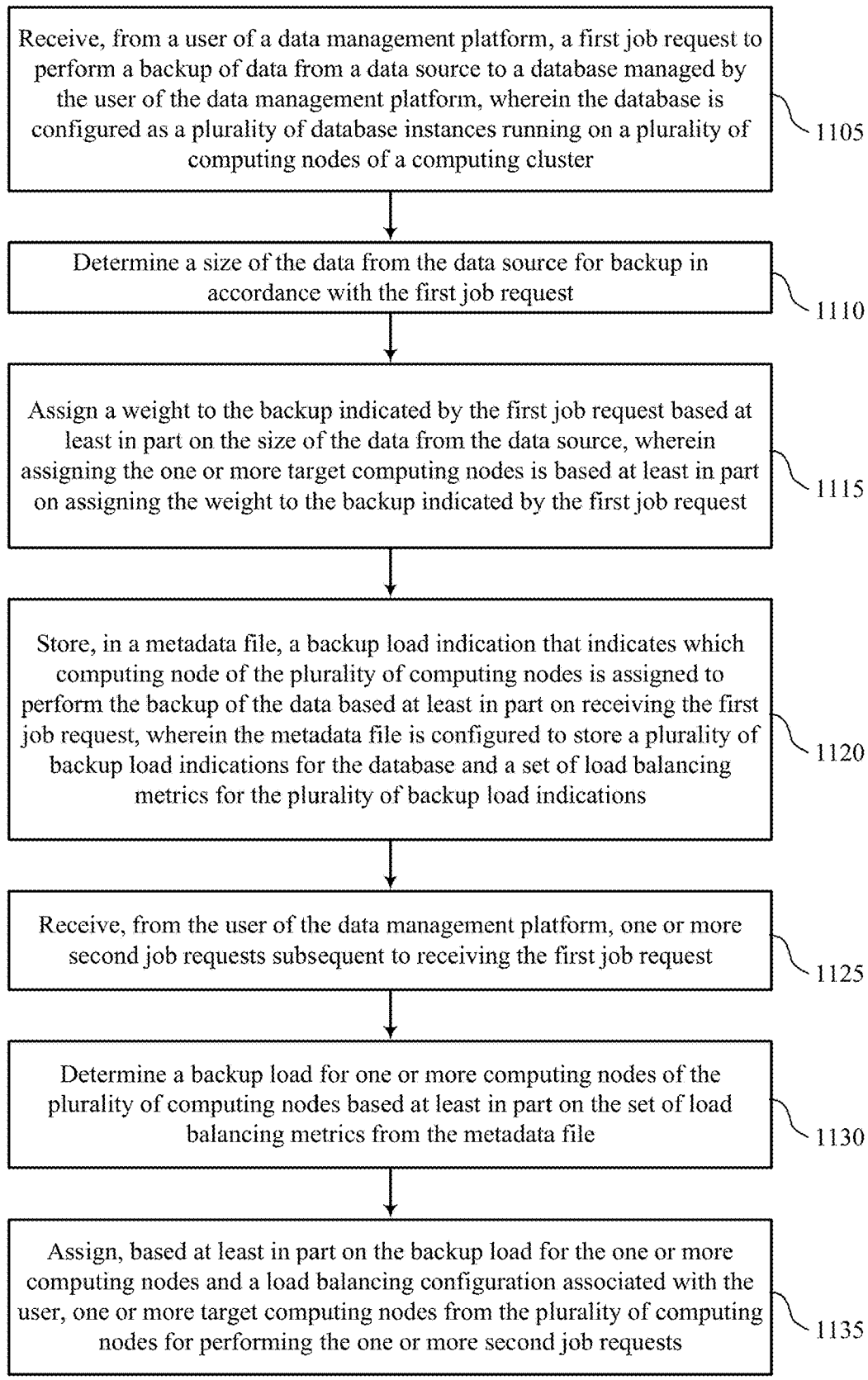

FIG. 11 shows a flowchart illustrating a method 1100 that supports automatic backup distribution for clustered databases in accordance with aspects of the present disclosure. The operations of the method 1100 may be implemented by a data source or its components as described herein. For example, the operations of the method 1100 may be performed by a data source as described with reference to FIGS. 1 through 9. In some examples, a data source may execute a set of instructions to control the functional elements of the data source to perform the described functions. Additionally or alternatively, the data source may perform aspects of the described functions using special-purpose hardware.

At 1105, the method may include receiving, from a user of a data management platform, a first job request to perform a backup of data from a data source to a database managed by the user of the data management platform, wherein the database is configured as a plurality of database instances running on a plurality of computing nodes of a computing cluster. The operations of 1105 may be performed in accordance with examples as disclosed herein. In some examples, aspects of the operations of 1105 may be performed by a job request component 825 as described with reference to FIG. 8.

At 1110, the method may include determining a size of the data from the data source for backup in accordance with the first job request. The operations of 1110 may be performed in accordance with examples as disclosed herein. In some examples, aspects of the operations of 1110 may be performed by a data component 845 as described with reference to FIG. 8.

At 1115, the method may include assigning a weight to the backup indicated by the first job request based at least in part on the size of the data from the data source, wherein assigning the one or more target computing nodes is based at least in part on assigning the weight to the backup indicated by the first job request. The operations of 1115 may be performed in accordance with examples as disclosed herein. In some examples, aspects of the operations of 1115 may be performed by a backup weight component 850 as described with reference to FIG. 8.

At 1120, the method may include storing, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications. The operations of 1120 may be performed in accordance with examples as disclosed herein. In some examples, aspects of the operations of 1120 may be performed by a storage component 830 as described with reference to FIG. 8.

At 1125, the method may include receiving, from the user of the data management platform, one or more second job requests subsequent to receiving the first job request. The operations of 1125 may be performed in accordance with examples as disclosed herein. In some examples, aspects of the operations of 1125 may be performed by a job request component 825 as described with reference to FIG. 8.

At 1130, the method may include determining a backup load for one or more computing nodes of the plurality of computing nodes based at least in part on the set of load balancing metrics from the metadata file. The operations of 1130 may be performed in accordance with examples as disclosed herein. In some examples, aspects of the operations of 1130 may be performed by a backup load component 835 as described with reference to FIG. 8.

At 1135, the method may include assigning, based at least in part on the backup load for the one or more computing nodes and a load balancing configuration associated with the user, one or more target computing nodes from the plurality of computing nodes for performing the one or more second job requests. The operations of 1135 may be performed in accordance with examples as disclosed herein. In some examples, aspects of the operations of 1135 may be performed by a node assignment component 840 as described with reference to FIG. 8.

Figure 12:
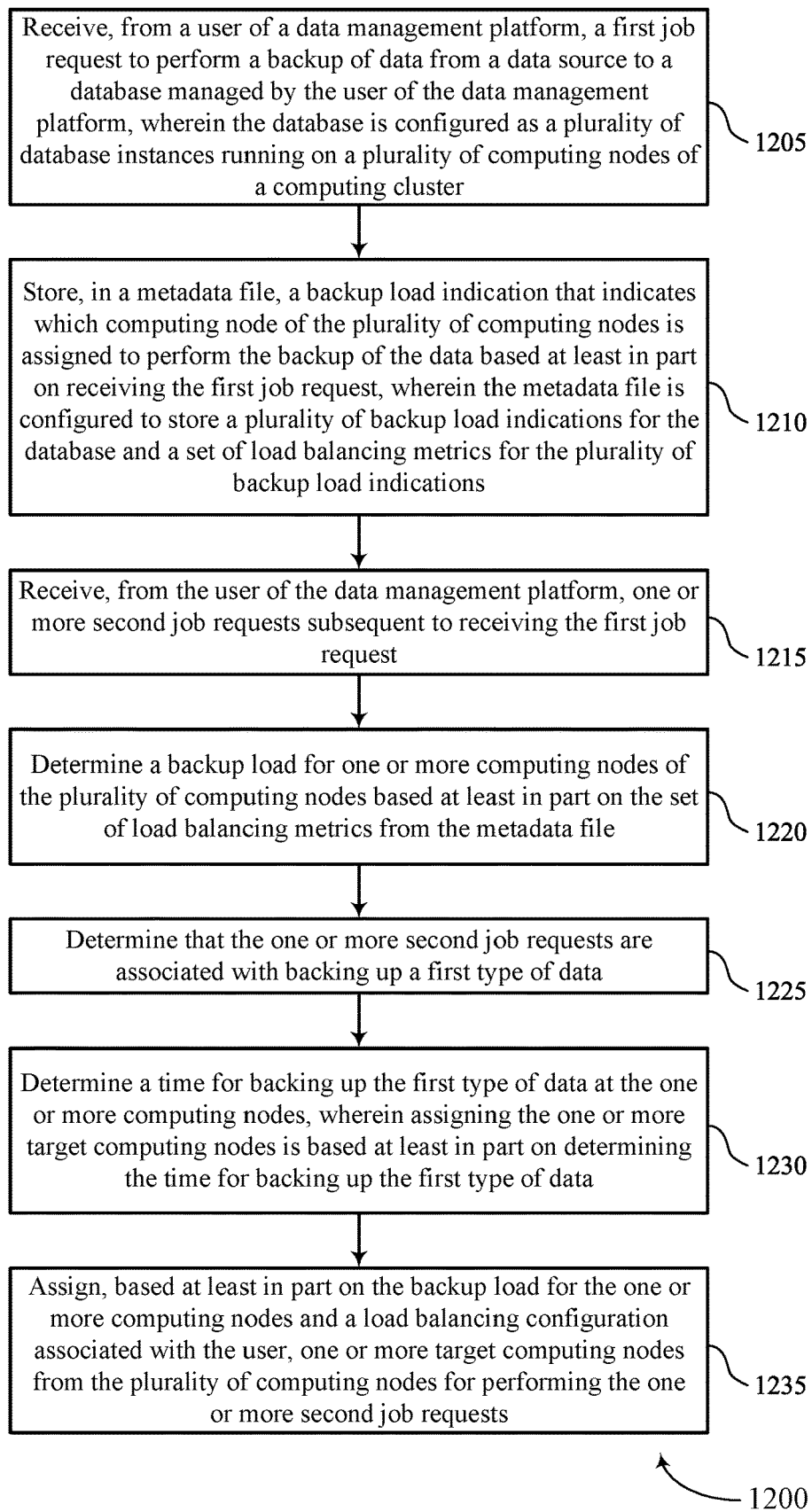

FIG. 12 shows a flowchart illustrating a method 1200 that supports automatic backup distribution for clustered databases in accordance with aspects of the present disclosure. The operations of the method 1200 may be implemented by a data source or its components as described herein. For example, the operations of the method 1200 may be performed by a data source as described with reference to FIGS. 1 through 9. In some examples, a data source may execute a set of instructions to control the functional elements of the data source to perform the described functions. Additionally or alternatively, the data source may perform aspects of the described functions using special-purpose hardware.

At 1205, the method may include receiving, from a user of a data management platform, a first job request to perform a backup of data from a data source to a database managed by the user of the data management platform, wherein the database is configured as a plurality of database instances running on a plurality of computing nodes of a computing cluster. The operations of 1205 may be performed in accordance with examples as disclosed herein. In some examples, aspects of the operations of 1205 may be performed by a job request component 825 as described with reference to FIG. 8.

At 1210, the method may include storing, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications. The operations of 1210 may be performed in accordance with examples as disclosed herein. In some examples, aspects of the operations of 1210 may be performed by a storage component 830 as described with reference to FIG. 8.

At 1215, the method may include receiving, from the user of the data management platform, one or more second job requests subsequent to receiving the first job request. The operations of 1215 may be performed in accordance with examples as disclosed herein. In some examples, aspects of the operations of 1215 may be performed by a job request component 825 as described with reference to FIG. 8.

At 1220, the method may include determining a backup load for one or more computing nodes of the plurality of computing nodes based at least in part on the set of load balancing metrics from the metadata file. The operations of 1220 may be performed in accordance with examples as disclosed herein. In some examples, aspects of the operations of 1220 may be performed by a backup load component 835 as described with reference to FIG. 8.

At 1225, the method may include determining that the one or more second job requests are associated with backing up a first type of data. The operations of 1225 may be performed in accordance with examples as disclosed herein. In some examples, aspects of the operations of 1225 may be performed by a job request component 825 as described with reference to FIG. 8.

At 1230, the method may include determining a time for backing up the first type of data at the one or more computing nodes, wherein assigning the one or more target computing nodes is based at least in part on determining the time for backing up the first type of data. The operations of 1230 may be performed in accordance with examples as disclosed herein. In some examples, aspects of the operations of 1230 may be performed by a backup time component 855 as described with reference to FIG. 8.

At 1235, the method may include assigning, based at least in part on the backup load for the one or more computing nodes and a load balancing configuration associated with the user, one or more target computing nodes from the plurality of computing nodes for performing the one or more second job requests. The operations of 1235 may be performed in accordance with examples as disclosed herein. In some examples, aspects of the operations of 1235 may be performed by a node assignment component 840 as described with reference to FIG. 8.

Figure 13:
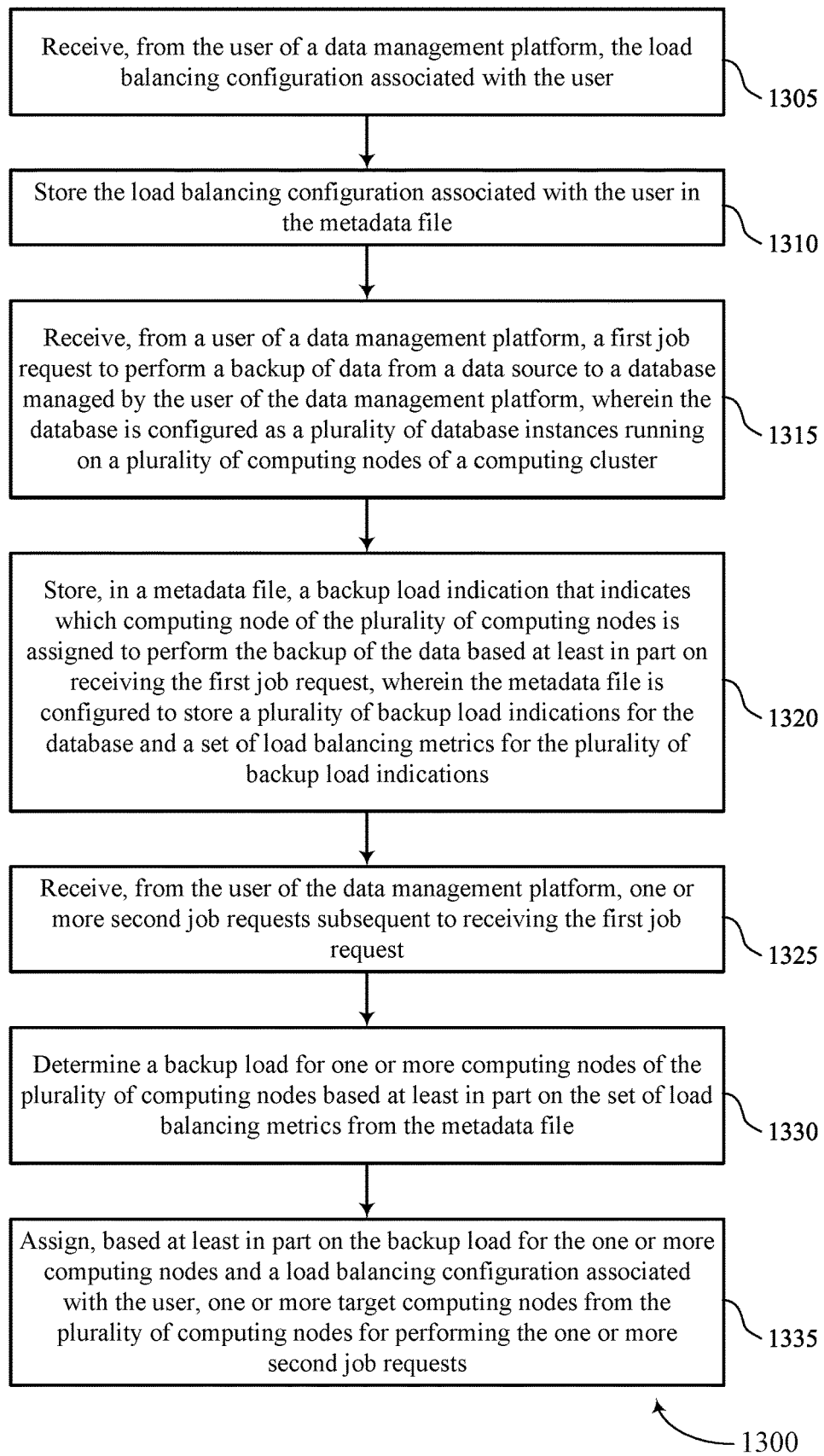

FIG. 13 shows a flowchart illustrating a method 1300 that supports automatic backup distribution for clustered databases in accordance with aspects of the present disclosure. The operations of the method 1300 may be implemented by a data source or its components as described herein. For example, the operations of the method 1300 may be performed by a data source as described with reference to FIGS. 1 through 9. In some examples, a data source may execute a set of instructions to control the functional elements of the data source to perform the described functions. Additionally or alternatively, the data source may perform aspects of the described functions using special-purpose hardware.

At 1305, the method may include receiving, from the user of a data management platform, the load balancing configuration associated with the user. The operations of 1305 may be performed in accordance with examples as disclosed herein. In some examples, aspects of the operations of 1305 may be performed by a configuration component 865 as described with reference to FIG. 8.

At 1310, the method may include storing the load balancing configuration associated with the user in the metadata file. The operations of 1310 may be performed in accordance with examples as disclosed herein. In some examples, aspects of the operations of 1310 may be performed by a configuration component 865 as described with reference to FIG. 8.

At 1315, the method may include receiving, from a user of a data management platform, a first job request to perform a backup of data from a data source to a database managed by the user of the data management platform, wherein the database is configured as a plurality of database instances running on a plurality of computing nodes of a computing cluster. The operations of 1315 may be performed in accordance with examples as disclosed herein. In some examples, aspects of the operations of 1315 may be performed by a job request component 825 as described with reference to FIG. 8.

At 1320, the method may include storing, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications. The operations of 1320 may be performed in accordance with examples as disclosed herein. In some examples, aspects of the operations of 1320 may be performed by a storage component 830 as described with reference to FIG. 8.

At 1325, the method may include receiving, from the user of the data management platform, one or more second job requests subsequent to receiving the first job request. The operations of 1325 may be performed in accordance with examples as disclosed herein. In some examples, aspects of the operations of 1325 may be performed by a job request component 825 as described with reference to FIG. 8.

At 1330, the method may include determining a backup load for one or more computing nodes of the plurality of computing nodes based at least in part on the set of load balancing metrics from the metadata file. The operations of 1330 may be performed in accordance with examples as disclosed herein. In some examples, aspects of the operations of 1330 may be performed by a backup load component 835 as described with reference to FIG. 8.

At 1335, the method may include assigning, based at least in part on the backup load for the one or more computing nodes and a load balancing configuration associated with the user, one or more target computing nodes from the plurality of computing nodes for performing the one or more second job requests. The operations of 1335 may be performed in accordance with examples as disclosed herein. In some examples, aspects of the operations of 1335 may be performed by a node assignment component 840 as described with reference to FIG. 8.

A method for backup job distribution is described. The method may include receiving, from a user of a data management platform, a first job request to perform a backup of data from a data source to a database managed by the user of the data management platform, wherein the database is configured as a plurality of database instances running on a plurality of computing nodes of a computing cluster, storing, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications, receiving, from the user of the data management platform, one or more second job requests subsequent to receiving the first job request, determining a backup load for one or more computing nodes of the plurality of computing nodes based at least in part on the set of load balancing metrics from the metadata file, and assigning, based at least in part on the backup load for the one or more computing nodes and a load balancing configuration associated with the user, one or more target computing nodes from the plurality of computing nodes for performing the one or more second job requests.

An apparatus for backup job distribution is described. The apparatus may include a processor, memory coupled with the processor, and instructions stored in the memory. The instructions may be executable by the processor to cause the apparatus to receive, from a user of a data management platform, a first job request to perform a backup of data from a data source to a database managed by the user of the data management platform, wherein the database is configured as a plurality of database instances running on a plurality of computing nodes of a computing cluster, store, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications, receive, from the user of the data management platform, one or more second job requests subsequent to receiving the first job request, determine a backup load for one or more computing nodes of the plurality of computing nodes based at least in part on the set of load balancing metrics from the metadata file, and assign, based at least in part on the backup load for the one or more computing nodes and a load balancing configuration associated with the user, one or more target computing nodes from the plurality of computing nodes for performing the one or more second job requests.

Another apparatus for backup job distribution is described. The apparatus may include means for receiving, from a user of a data management platform, a first job request to perform a backup of data from a data source to a database managed by the user of the data management platform, wherein the database is configured as a plurality of database instances running on a plurality of computing nodes of a computing cluster, means for storing, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications, means for receiving, from the user of the data management platform, one or more second job requests subsequent to receiving the first job request, means for determining a backup load for one or more computing nodes of the plurality of computing nodes based at least in part on the set of load balancing metrics from the metadata file, and means for assigning, based at least in part on the backup load for the one or more computing nodes and a load balancing configuration associated with the user, one or more target computing nodes from the plurality of computing nodes for performing the one or more second job requests.

A non-transitory computer-readable medium storing code for backup job distribution is described. The code may include instructions executable by a processor to receive, from a user of a data management platform, a first job request to perform a backup of data from a data source to a database managed by the user of the data management platform, wherein the database is configured as a plurality of database instances running on a plurality of computing nodes of a computing cluster, store, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications, receive, from the user of the data management platform, one or more second job requests subsequent to receiving the first job request, determine a backup load for one or more computing nodes of the plurality of computing nodes based at least in part on the set of load balancing metrics from the metadata file, and assign, based at least in part on the backup load for the one or more computing nodes and a load balancing configuration associated with the user, one or more target computing nodes from the plurality of computing nodes for performing the one or more second job requests.

Some examples of the method, apparatuses, and non-transitory computer-readable medium described herein may further include operations, features, means, or instructions for determining a size of the data from the data source for backup in accordance with the first job request and assigning a weight to the backup indicated by the first job request based at least in part on the size of the data from the data source, wherein assigning the one or more target computing nodes may be based at least in part on assigning the weight to the backup indicated by the first job request.

Some examples of the method, apparatuses, and non-transitory computer-readable medium described herein may further include operations, features, means, or instructions for determining an amount of data for backup in accordance with the one or more second job requests, wherein assigning the one or more target computing nodes may be based at least in part on determining the amount of data.

Some examples of the method, apparatuses, and non-transitory computer-readable medium described herein may further include operations, features, means, or instructions for determining that the one or more second job requests may be associated with backing up a first type of data and determining a time for backing up the first type of data at the one or more computing nodes, wherein assigning the one or more target computing nodes may be based at least in part on determining the time for backing up the first type of data.

Some examples of the method, apparatuses, and non-transitory computer-readable medium described herein may further include operations, features, means, or instructions for determining that the one or more second job requests comprises job requests for a first type of job and job requests for a second type of job and adding the job requests for the first type of job and the job requests for the second type of job to a backup job queue, wherein assigning the one or more target computing nodes may be based at least in part on the backup job queue.

Some examples of the method, apparatuses, and non-transitory computer-readable medium described herein may further include operations, features, means, or instructions for determining that the one or more second job requests comprises job requests for a first type of job and job requests for a second type of job and adding the job requests for the first type of job to a first backup job queue and the job requests for the second type of job to a second backup job queue, wherein assigning the one or more target computing nodes may be based at least in part on the first backup job queue and the second backup job queue.

Some examples of the method, apparatuses, and non-transitory computer-readable medium described herein may further include operations, features, means, or instructions for determining that a first computing node of the plurality of computing nodes may be assigned to perform the backup of the data based at least in part on the first job request, wherein assigning the one or more target computing nodes comprises assigning a second computing node of the plurality of computing nodes for performing the one or more second job requests, the second computing node being different from the first computing node.

Some examples of the method, apparatuses, and non-transitory computer-readable medium described herein may further include operations, features, means, or instructions for receiving, from the user of a data management platform, the load balancing configuration associated with the user and storing the load balancing configuration associated with the user in the metadata file.

In some examples of the method, apparatuses, and non-transitory computer-readable medium described herein, the one or more second job requests comprise at least one of a job request to backup the database, a job request to backup transactions on the database, a recovery job request, a validation job request, or a combination thereof.

Some examples of the method, apparatuses, and non-transitory computer-readable medium described herein may further include operations, features, means, or instructions for determining a change to the computing cluster comprising the plurality of computing nodes, wherein assigning the one or more target computing nodes may be based at least in part on the change to the computing cluster.

In some examples of the method, apparatuses, and non-transitory computer-readable medium described herein, the change to the computing cluster comprises at least one of a change to a cluster architecture, a change to a quantity of the plurality of database instances, or a combination thereof. In some examples of the method, apparatuses, and non-transitory computer-readable medium described herein, the database comprises a clustered database or a stand-alone database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, from a user of a data management platform, a first job request to perform a backup of data from a data source to a database managed by the user of the data management platform, wherein the database is configured as a plurality of database instances running on a plurality of computing nodes of a computing cluster;
   storing, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications, wherein the set of load balancing metrics indicate a quantity of current backup jobs running on a first computing node of one or more computing nodes, the current backup jobs being associated with a backup job type comprising a transaction log backup job type or a database backup job type;
   receiving, from the user of the data management platform, one or more second job requests of the database backup job type;
   determining a time taken to run a previous backup job at the first computing node, the previous backup job having the database backup job type;
   determining a backup load for the first computing node based at least in part on a subset of the quantity of current backup jobs running on the first computing node indicated in the metadata file and the time taken to run the previous backup job, wherein the subset of the quantity of current backup jobs has a same backup job type as the one or more second job requests, and wherein a remaining subset of the current backup jobs has a different backup job type from the one or more second job requests; and
   assigning the one or more second job requests of the database backup job type to the first computing node based at least in part on the backup load for the first computing node determined based at least in part on the time taken to run the previous backup job at the first computing node.

2. The method of claim 1, further comprising:
   determining a size of the data from the data source for backup in accordance with the first job request; and
   assigning a weight to the backup indicated by the first job request based at least in part on the size of the data from the data source, wherein assigning the one or more second job requests is based at least in part on assigning the weight to the backup indicated by the first job request.

3. The method of claim 1, further comprising:
   determining an amount of data for backup in accordance with the one or more second job requests, wherein assigning the one or more second job requests is based at least in part on determining the amount of data.

4. The method of claim 1, further comprising:
determining that the one or more second job requests are associated with backing up a first type of data; and
determining a time for backing up the first type of data at the one or more computing nodes, wherein assigning the one or more second job requests is based at least in part on determining the time for backing up the first type of data.

5. The method of claim 1, further comprising:
determining that the one or more second job requests comprises job requests for a first type of job and job requests for a second type of job; and
adding the job requests for the first type of job and the job requests for the second type of job to a backup job queue, wherein assigning the one or more second job requests is based at least in part on the backup job queue.

6. The method of claim 1, further comprising:
determining that the one or more second job requests comprises job requests for a first type of job and job requests for a second type of job; and
adding the job requests for the first type of job to a first backup job queue and the job requests for the second type of job to a second backup job queue, wherein assigning the one or more second job requests is based at least in part on the first backup job queue and the second backup job queue.

7. The method of claim 1, further comprising:
determining that the first computing node of the plurality of computing nodes is assigned to perform the backup of the data based at least in part on the first job request, wherein assigning the one or more second job requests comprises assigning a second computing node of the plurality of computing nodes for performing the one or more second job requests, the second computing node being different from the first computing node.

8. The method of claim 1, further comprising:
receiving, from the user of the data management platform, a load balancing configuration associated with the user; and
storing the load balancing configuration associated with the user in the metadata file.

9. The method of claim 1, wherein the one or more second job requests comprise at least one of a job request to backup the database, a job request to backup transactions on the database, a recovery job request, a validation job request, or a combination thereof.

10. The method of claim 1, further comprising:
determining a change to the computing cluster comprising the plurality of computing nodes, wherein assigning the one or more second job requests is based at least in part on the change to the computing cluster.

11. The method of claim 10, wherein the change to the computing cluster comprises at least one of a change to a cluster architecture, a change to a quantity of the plurality of database instances, or a combination thereof.

12. The method of claim 1, wherein the database comprises a clustered database or a stand-alone database.

13. An apparatus, comprising:
at least one processor;
at least one memory coupled with the at least one processor; and
instructions stored in the at least one memory and executable by the at least one processor to cause the apparatus to:

receive, from a user of a data management platform, a first job request to perform a backup of data from a data source to a database managed by the user of the data management platform, wherein the database is configured as a plurality of database instances running on a plurality of computing nodes of a computing cluster;
store, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications, wherein the set of load balancing metrics indicate a quantity of current backup jobs running on a first computing node of one or more computing nodes, the current backup jobs being associated with a backup job type comprising a transaction log backup job type or a database backup job type;
receive, from the user of the data management platform, one or more second job requests of the database backup job type;
determine a time taken to run a previous backup job at the first computing node, the previous backup job having the database backup job type;
determine a backup load for the first computing node based at least in part on a subset of the quantity of current backup jobs running on the first computing node indicated in the metadata file and the time taken to run the previous backup job, wherein the subset of the quantity of current backup jobs has a same backup job type as the one or more second job requests, and wherein a remaining subset of the current backup jobs has a different backup job type from the one or more second job requests; and
assign the one or more second job requests of the database backup job type to the first computing node based at least in part on the backup load for the first computing node determined based at least in part on the time taken to run the previous backup job at the first computing node.

14. The apparatus of claim 13, wherein the instructions are further executable by the at least one processor to cause the apparatus to:
determine a size of the data from the data source for backup in accordance with the first job request; and
assign a weight to the backup indicated by the first job request based at least in part on the size of the data from the data source, wherein assigning the one or more second job requests is based at least in part on assigning the weight to the backup indicated by the first job request.

15. The apparatus of claim 13, wherein the instructions are further executable by the at least one processor to cause the apparatus to:
determine an amount of data for backup in accordance with the one or more second job requests, wherein assigning the one or more second job requests is based at least in part on determining the amount of data.

16. The apparatus of claim 13, wherein the instructions are further executable by the at least one processor to cause the apparatus to:
determine that the one or more second job requests are associated with backing up a first type of data; and
determine a time for backing up the first type of data at the one or more computing nodes, wherein assigning the one or more second job requests is based at least in part on determining the time for backing up the first type of data.

17. The apparatus of claim 13, wherein the instructions are further executable by the at least one processor to cause the apparatus to:
   determine that the one or more second job requests comprises job requests for a first type of job and job requests for a second type of job; and
   add the job requests for the first type of job and the job requests for the second type of job to a backup job queue, wherein assigning the one or more second job requests is based at least in part on the backup job queue.

18. The apparatus of claim 13, wherein the instructions are further executable by the at least one processor to cause the apparatus to:
   determine that the one or more second job requests comprises job requests for a first type of job and job requests for a second type of job; and
   add the job requests for the first type of job to a first backup job queue and the job requests for the second type of job to a second backup job queue, wherein assigning the one or more second job requests is based at least in part on the first backup job queue and the second backup job queue.

19. The apparatus of claim 13, wherein the instructions are further executable by the at least one processor to cause the apparatus to:
   determine that the first computing node of the plurality of computing nodes is assigned to perform the backup of the data based at least in part on the first job request, wherein assigning the one or more second job requests comprises assigning a second computing node of the plurality of computing nodes for performing the one or more second job requests, the second computing node being different from the first computing node.

20. A non-transitory computer-readable medium storing code, the code comprising instructions executable by at least one processor to:
   receive, from a user of a data management platform, a first job request to perform a backup of data from a data source to a database managed by the user of the data management platform, wherein the database is configured as a plurality of database instances running on a plurality of computing nodes of a computing cluster;
   store, in a metadata file, a backup load indication that indicates which computing node of the plurality of computing nodes is assigned to perform the backup of the data based at least in part on receiving the first job request, wherein the metadata file is configured to store a plurality of backup load indications for the database and a set of load balancing metrics for the plurality of backup load indications, wherein the set of load balancing metrics indicate a quantity of current backup jobs running on a first computing node of one or more computing nodes, the current backup jobs being associated with a backup job type comprising a transaction log backup job type or a database backup job type;
   receive, from the user of the data management platform, one or more second job requests of the database backup job type;
   determine a time taken to run a previous backup job at the first computing node, the previous backup job having the database backup job type;
   determine a backup load for the first computing node based at least in part on a subset of the quantity of current backup jobs running on the first computing node indicated in the metadata file and the time taken to run the previous backup job, wherein the subset of the quantity of current backup jobs has a same backup job type as the one or more second job requests, and wherein a remaining subset of the current backup jobs has a different backup job type from the one or more second job requests; and
   assign the one or more second job requests of the database backup job type to the first computing node based at least in part on the backup load for the first computing node determined based at least in part on the time taken to run the previous backup job at the first computing node.

* * * * *